(12) United States Patent  (10) Patent No.: US 8,353,476 B2
Crook et al.  (45) Date of Patent: Jan. 15, 2013

(54) TRUSS-SHAPED ENGINE PYLON AND METHOD OF MAKING SAME

(75) Inventors: Gordon R. Crook, Towanda, KS (US); Randall R. West, Wichita, KS (US); George Larimore Huggins, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 495 days.

(21) Appl. No.: 12/623,586

(22) Filed: Nov. 23, 2009

(65) Prior Publication Data

US 2011/0121132 A1    May 26, 2011

(51) Int. Cl.
*B64D 27/26* (2006.01)
(52) U.S. Cl. .............. 244/54; 248/554; 60/796; 60/797; 244/123.4; 52/641; 52/645
(58) Field of Classification Search .................. 244/54, 244/123.4; 60/796, 797; 248/554–557; 52/641, 52/645
See application file for complete search history.

(56) References Cited

U.S. PATENT DOCUMENTS

| 4,489,659 A | 12/1984 | Kamohara et al. |
| 5,218,919 A | 6/1993 | Krulikowski, III et al. |
| 7,104,306 B2 | 9/2006 | Huggins et al. |
| 2007/0120010 A1* | 5/2007 | Huggins et al. ................. 244/54 |

* cited by examiner

*Primary Examiner* — Tien Dinh
*Assistant Examiner* — Nicholas McFall
(74) *Attorney, Agent, or Firm* — Hovey Williams LLP

(57) ABSTRACT

An aircraft engine pylon comprises a top wall, a bottom wall, a left side wall, and a right side wall. The left side wall includes a left truss structure along with a left upper ledge and a left lower ledge. The right side wall includes a right truss structure along with a right upper ledge and a right lower ledge. The top wall is joined with the left upper ledge and the right upper ledge and an upper truss structure is formed in the left upper ledge, the right upper ledge, and the top wall. The bottom wall is joined with the left lower ledge and the right lower ledge and a lower truss structure is formed in the left lower ledge, the right lower ledge, and the bottom wall.

15 Claims, 24 Drawing Sheets

2600

```
┌─────────────────────────────────────────────────────────┐
│ FORM A TOP WALL TO INCLUDE A MITERED SURFACE ALONG      │─2601
│           EACH OF TWO OPPOSING EDGES                    │
└─────────────────────────────────────────────────────────┘

┌─────────────────────────────────────────────────────────┐
│ FORM A BOTTOM WALL TO INCLUDE A MITERED SURFACE         │─2602
│          ALONG EACH OF TWO OPPOSING EDGES               │
└─────────────────────────────────────────────────────────┘

┌─────────────────────────────────────────────────────────┐
│ FORM A LEFT SIDE WALL TO INCLUDE A MITERED SURFACE      │─2603
│          ALONG EACH OF TWO OPPOSING EDGES               │
└─────────────────────────────────────────────────────────┘

┌─────────────────────────────────────────────────────────┐
│ FORM A RIGHT SIDE WALL TO INCLUDE A MITERED SURFACE     │─2604
│          ALONG EACH OF TWO OPPOSING EDGES               │
└─────────────────────────────────────────────────────────┘

┌─────────────────────────────────────────────────────────┐
│ FORM A SPLATTER GUARD ADJACENT TO THE MITERED           │─2605
│        SURFACE ALONG ONE EDGE OF EACH WALL              │
└─────────────────────────────────────────────────────────┘

┌─────────────────────────────────────────────────────────┐
│ POSITION THE WALLS TO BE JOINED WITH ONE ANOTHER        │
│ SUCH THAT THE MITERED SURFACES OF EACH WALL ARE         │─2606
│ ALIGNED WITH THE MITERED SURFACES OF THE ADJACENT       │
│ WALLS AND THE SPLATTER GUARDS ARE POSITIONED IN THE     │
│              INTERIOR CORNERS OF THE PYLON              │
└─────────────────────────────────────────────────────────┘

┌─────────────────────────────────────────────────────────┐
│ JOIN THE WALLS TOGETHER SUCH THAT NO MATERIAL IS        │─2607
│        EJECTED INTO THE INTERIOR OF THE PYLON           │
└─────────────────────────────────────────────────────────┘

┌─────────────────────────────────────────────────────────┐
│ REMOVE THE SPLATTER GUARD AFTER THE WALLS ARE           │─2608
│                    JOINED TOGETHER                      │
└─────────────────────────────────────────────────────────┘
```

- 2701 FORM A LEFT SIDE WALL INCLUDING A LEFT TRUSS STRUCTURE, A LEFT UPPER LEDGE, AND A LEFT LOWER LEDGE WITH A TAB AT OPPOSING ENDS OF THE LEFT UPPER LEDGE AND THE LEFT LOWER LEDGE

- 2702 FORM A RIGHT SIDE WALL INCLUDING A RIGHT TRUSS STRUCTURE, A RIGHT UPPER LEDGE, AND A RIGHT LOWER LEDGE WITH A TAB AT OPPOSING ENDS OF THE RIGHT UPPER LEDGE AND THE RIGHT LOWER LEDGE

- 2703 JOIN A SOLID TOP WALL INCLUDING A PAIR OF TABS AT OPPOSING ENDS WITH THE LEFT UPPER LEDGE AND THE RIGHT UPPER LEDGE WITH A JOINT OCCURRING BETWEEN THE TABS

- 2704 JOIN A SOLID BOTTOM WALL INCLUDING A PAIR OF TABS AT OPPOSING ENDS WITH THE LEFT LOWER LEDGE AND THE RIGHT LOWER LEDGE WITH THE JOINT OCCURRING BETWEEN THE TABS

- 2705 FORM AN UPPER TRUSS STRUCTURE IN THE TOP WALL WITH AT LEAST A PORTION OF THE UPPER TRUSS STRUCTURE LOCATED IN THE LEFT UPPER LEDGE AND IN THE RIGHT UPPER LEDGE

- 2706 FORM A LOWER TRUSS STRUCTURE IN THE BOTTOM WALL WITH AT LEAST A PORTION OF THE LOWER TRUSS STRUCTURE LOCATED IN THE LEFT LOWER LEDGE AND IN THE RIGHT LOWER LEDGE

- 2707 REMOVE ALL TABS FROM THE PYLON

- 2708 JOIN WING ATTACHMENT LUGS AND ENGINE ATTACHMENT LUGS TO THE PYLON

2801 — FORM A LEFT SIDE WALL INCLUDING A LEFT TRUSS STRUCTURE, A LEFT UPPER LEDGE, AND A LEFT LOWER LEDGE WITH A TAB AT OPPOSING ENDS OF THE LEFT UPPER LEDGE AND THE LEFT LOWER LEDGE

2802 — FORM A RIGHT SIDE WALL INCLUDING A RIGHT TRUSS STRUCTURE, A RIGHT UPPER LEDGE, AND A RIGHT LOWER LEDGE WITH A TAB AT OPPOSING ENDS OF THE RIGHT UPPER LEDGE AND THE RIGHT LOWER LEDGE

2803 — FORM A TOP WALL INCLUDING AT LEAST A PORTION OF AN UPPER TRUSS STRUCTURE WITH A PAIR OF TABS AT OPPOSING ENDS OF THE TOP WALL

2804 — FORM A BOTTOM WALL INCLUDING AT LEAST A PORTION OF A LOWER TRUSS STRUCTURE WITH A PAIR OF TABS AT OPPOSING ENDS OF THE BOTTOM WALL

2805 — JOIN THE TOP WALL WITH THE LEFT UPPER LEDGE AND THE RIGHT UPPER LEDGE WITH A JOINT OCCURRING BETWEEN THE TABS

2806 — JOIN THE BOTTOM WALL WITH THE LEFT LOWER LEDGE AND THE RIGHT LOWER LEDGE WITH THE JOINT OCCURRING BETWEEN THE TABS

2807 — FORM A PORTION OF THE UPPER TRUSS STRUCTURE ON THE LEFT UPPER LEDGE AND THE RIGHT UPPER LEDGE

2808 — FORM A PORTION OF THE LOWER TRUSS STRUCTURE ON THE LEFT LOWER LEDGE AND THE RIGHT LOWER LEDGE

2809 — REMOVE ALL TABS FROM THE PYLON

2810 — JOIN WING ATTACHMENT LUGS AND ENGINE ATTACHMENT LUGS TO THE PYLON

2901 — FORM A LEFT SIDE WALL INCLUDING A LEFT TRUSS STRUCTURE AND A LEFT UPPER LEDGE THAT INCLUDES AT LEAST A PORTION OF AN UPPER TRUSS STRUCTURE AND A LEFT LOWER LEDGE THAT INCLUDES AT LEAST A PORTION OF A LOWER TRUSS STRUCTURE WITH A TAB AT OPPOSING ENDS OF THE LEFT UPPER LEDGE AND THE LEFT LOWER LEDGE AND FURTHER INCLUDING SACRIFICIAL MATERIAL IN THE UPPER TRUSS STRUCTURE AND THE LOWER TRUSS STRUCTURE

2902 — FORM A RIGHT SIDE WALL INCLUDING A RIGHT TRUSS STRUCTURE AND A RIGHT UPPER LEDGE THAT INCLUDES AT LEAST A PORTION OF THE UPPER TRUSS STRUCTURE AND A RIGHT LOWER LEDGE THAT INCLUDES AT LEAST A PORTION OF A LOWER TRUSS STRUCTURE WITH A TAB AT OPPOSING ENDS OF THE RIGHT UPPER LEDGE AND THE RIGHT LOWER LEDGE AND FURTHER INCLUDING SACRIFICIAL MATERIAL IN THE UPPER TRUSS STRUCTURE AND THE LOWER TRUSS STRUCTURE

2903 — FORM A TOP WALL WITH AT LEAST A PORTION OF THE UPPER TRUSS STRUCTURE THAT INCLUDES SACRIFICIAL MATERIAL AND A PAIR OF TABS AT OPPOSING ENDS OF THE TOP WALL

2904 — FORM A BOTTOM WALL WITH AT LEAST A PORTION OF THE LOWER TRUSS STRUCTURE THAT INCLUDES SACRIFICIAL MATERIAL AND A PAIR OF TABS AT OPPOSING ENDS OF THE BOTTOM WALL

2905 — JOIN THE TOP WALL WITH THE LEFT UPPER LEDGE AND THE RIGHT UPPER LEDGE WITH A PLURALITY OF JOINTS OCCURRING BETWEEN THE TABS AND SACRIFICIAL MATERIAL

2906 — JOIN THE BOTTOM WALL WITH THE LEFT LOWER LEDGE AND THE RIGHT LOWER LEDGE WITH A PLURALITY OF JOINTS OCCURRING BETWEEN THE TABS AND SACRIFICIAL MATERIAL

2907 — REMOVE ALL TABS AND SACRIFICIAL MATERIAL FROM THE PYLON STRUCTURE

2908 — JOIN WING ATTACHMENT LUGS AND ENGINE ATTACHMENT LUGS TO THE PYLON

*Fig. 29.*

```
                                    3000
                ┌─────────────────────────────────────────────────────────┐ ─ 3001
                │  FORM A LEFT SIDE WALL INCLUDING A LEFT TRUSS STRUCTURE  │
                │  AND A LEFT UPPER LEDGE THAT INCLUDES A FIRST PORTION OF AN │
                │    UPPER TRUSS STRUCTURE AND A LEFT LOWER LEDGE THAT    │
                │     INCLUDES A FIRST PORTION OF A LOWER TRUSS STRUCTURE │
                └─────────────────────────────────────────────────────────┘

┌─────────────────────────────────────────────────────────┐ ─ 3002
                │  FORM A RIGHT SIDE WALL INCLUDING A RIGHT TRUSS STRUCTURE │
                │  AND A RIGHT UPPER LEDGE THAT INCLUDES A SECOND PORTION OF │
                │  THE UPPER TRUSS STRUCTURE AND A RIGHT LOWER LEDGE THAT │
                │   INCLUDES A SECOND PORTION OF A LOWER TRUSS STRUCTURE  │
                └─────────────────────────────────────────────────────────┘

┌─────────────────────────────────────────────────────────┐ ─ 3003
                │   JOIN THE LEFT SIDE WALL WITH THE RIGHT SIDE WALL SUCH THAT │
                │       THE FIRST AND SECOND PORTIONS OF THE UPPER TRUSS  │
                │   STRUCTURE ARE JOINED AND THE FIRST AND SECOND PORTIONS OF │
                │            THE LOWER TRUSS STRUCTURE ARE JOINED         │
                └─────────────────────────────────────────────────────────┘

┌─────────────────────────────────────────────────────────┐
                │   JOIN WING ATTACHMENT LUGS AND ENGINE ATTACHMENT LUGS  │
                │                     TO THE PYLON                        │
                └─────────────────────────────────────────────────────────┘
                                                                         ─ 3004
```

*Fig. 30.*

TRUSS-SHAPED ENGINE PYLON AND METHOD OF MAKING SAME

BACKGROUND OF THE INVENTION

1. Field of the Invention

Embodiments of the present invention relate to pylons that couple an externally attached component to an aircraft wing or fuselage. More particularly, embodiments of the present invention relate to aircraft engine pylons constructed from truss-shaped components that are joined together.

2. Description of the Related Art

An aircraft pylon secures an aircraft engine, typically a high-bypass engine, to an aircraft wing. The pylon performs a number of critical functions such as supporting the engine weight, the fairings and systems, providing a fire and vapor barrier between the engine and the wing, transmitting the engine thrust into the structure of the airplane, supporting engine nacelle and thrust reverser in the optimum aerodynamic location, and the like. A typical pylon may include nearly a hundred parts, which may be held together by thousands of fasteners. The assembly of the pylon may include drilling hundreds of holes for coupling the parts together as well as extensive corrosion protection and sealing of joints and fasteners. The strength of the materials required for the pylon may make the drilling process very time consuming. Furthermore, the use of mechanical fasteners requires considerable overlapping of the joining surfaces which adds weight and cost. Thus, the production of aircraft engine pylons from a large number of joined-together components is time and labor intensive with a high part count and corresponding high cost.

One approach to alleviate some of these problems involves casting the aircraft pylons as a single integrated molded structure. However, castings of this nature have a high cost and present logistical issues. For example, casting of a flowable metal into a mold that forms the pylon is limited by the maximum pour weight of the metal foundry, which in turn may limit the size of the pylon that can be produced or may force a number of castings of portions of the pylon to be produced that need to be joined together. The use of fasteners to join the portions together leads to the problems discussed above.

SUMMARY OF THE INVENTION

Embodiments of the present invention solve the above-mentioned problems and provide a distinct advance in the art of aircraft pylons. More particularly, embodiments of the invention provide aircraft engine pylons constructed from truss-shaped components that are joined together such that the joints lie within truss structures.

Various embodiments of the invention may provide an aircraft engine pylon that comprises a top wall, a bottom wall, a left side wall, and a right side wall. The left side wall may include a left truss structure along with a left upper ledge and a left lower ledge. The right side wall may include a right truss structure along with a right upper ledge and a right lower ledge. The top wall may be joined to the left upper ledge and the right upper ledge. An upper truss structure may be formed in the left upper ledge, the right upper ledge, and the top wall. The bottom wall may be joined with the left lower ledge and the right lower ledge. A lower truss structure may be formed in the left lower ledge, the right lower ledge, and the bottom wall.

The pylon may include a plurality of wing attachment lugs coupled to the left side wall, the right side wall, and the top wall that is configured to couple the pylon to an aircraft wing. The pylon may further include an engine attachment interface and a plurality of engine attachment lugs coupled to the left side wall and the right side wall and configured to couple the pylon to the aircraft engine.

Various other embodiments of the pylon may comprise a forward truss unit, an aft truss unit, and a central engine mount interface. The forward truss unit may include a forward upper truss structure, a forward lower truss structure, a forward left truss structure, and a forward right truss structure and may be configured to couple the pylon to the aircraft engine. The aft truss unit may include an aft upper truss structure, an aft lower truss structure, an aft left truss structure, and an aft right truss structure and may be configured to couple the pylon to an aircraft wing. The central engine mount interface may be configured to couple the pylon to the aircraft engine and may be coupled to the aft portion of the forward truss unit and to the forward portion of the aft truss unit.

Various embodiments of the invention may provide a method of constructing an aircraft engine pylon. The steps of the method may include forming a left side wall with a left upper ledge and a left lower ledge and forming a right side wall with a right upper ledge and a right lower ledge. The method may also include joining a top wall that may include a portion of an upper truss structure to the left upper ledge with a single joint and the right upper ledge with a single joint. The method may further include joining a bottom wall that may include a portion of a lower truss structure to the left lower ledge with a single joint and the right lower ledge with a single joint. The method may additionally include forming a portion of the upper truss structure in the left upper ledge and the right upper ledge and forming a portion of the lower truss structure in the left lower ledge and the right lower ledge.

Various other embodiments of the method may comprise the steps of forming a forward truss unit including a forward upper truss structure, a forward lower truss structure, a forward left truss structure, and a forward right truss structure, and configured to couple the pylon to the aircraft engine. The method may also include the step of forming an aft truss unit including an aft upper truss structure, an aft lower truss structure, an aft left truss structure, and an aft right truss structure, and configured to couple the pylon to an aircraft wing. The method may further include the step of forming a central engine mount interface including a plurality of engine mount lugs and configured to couple the pylon to a portion of the aircraft engine. The method may additionally include the steps of joining the aft portion of the forward truss unit to the central engine mount interface and joining the forward portion of the aft truss unit to the central engine mount interface.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 26 is a flow diagram of at least a portion of the steps of a first embodiment of a method of creating a pylon;

FIG. 27 is a flow diagram of at least a portion of the steps of a second embodiment of a method of creating a pylon;

FIG. 28 is a flow diagram of at least a portion of the steps of a third embodiment of a method of creating a pylon;

FIG. 29 is a flow diagram of at least a portion of the steps of a fourth embodiment of a method of creating a pylon;

FIG. 30 is a flow diagram of at least a portion of the steps of a fifth embodiment of a method of creating a pylon.

Figure 1:
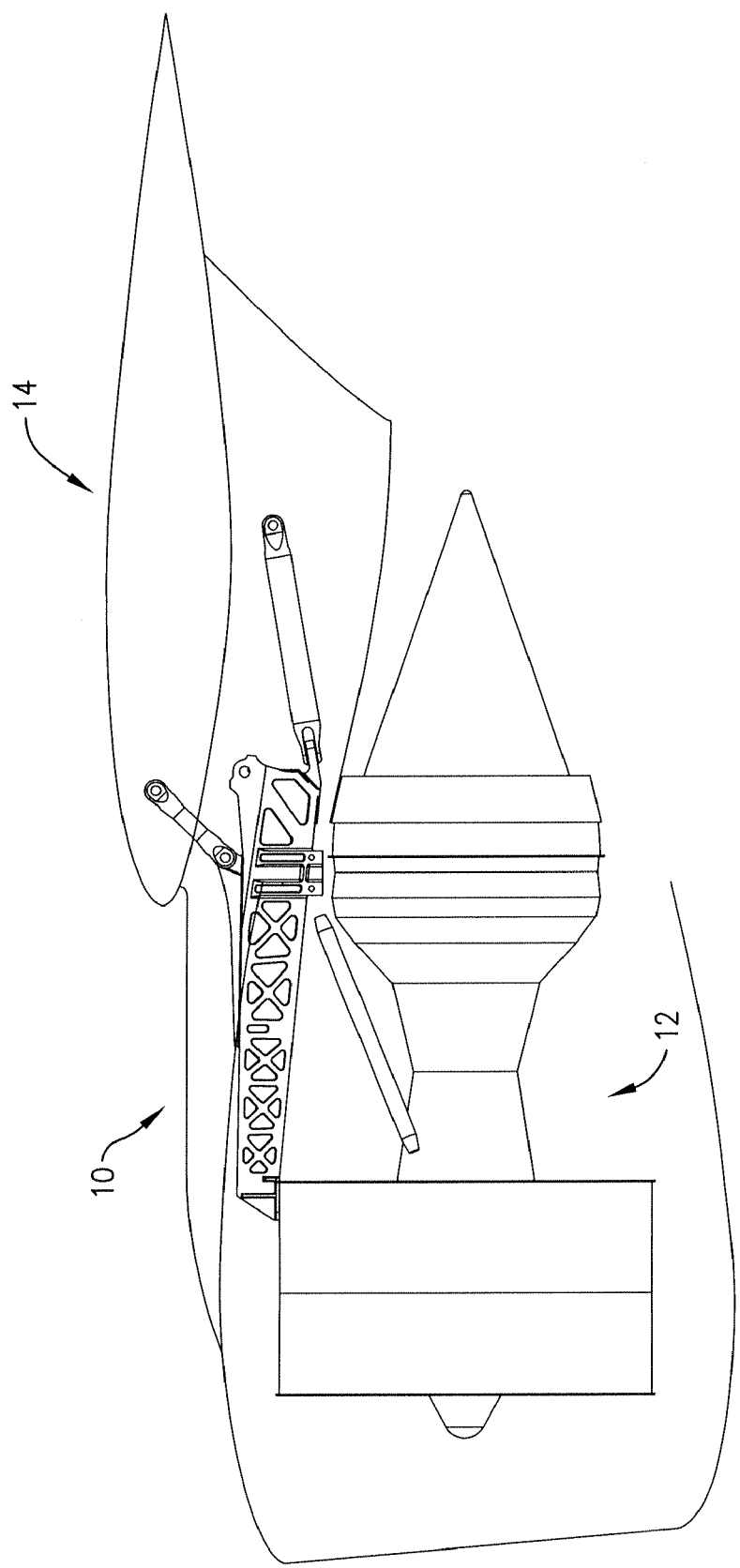
FIG. 1 is a side cutaway view of an aircraft engine and an aircraft wing showing a pylon constructed in accordance with at least a first embodiment of the present invention that couples the aircraft engine to the aircraft wing.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

An aircraft engine pylon 10 for securing an aircraft engine 12 to a wing 14 of an aircraft as constructed in accordance with various embodiments of the current invention is shown in FIG. 1. The aircraft may be a commercial airliner with a high-bypass jet engine, although other aircraft and engine combinations are possible. The pylon 10 may couple the upper portion of the engine 12 to the leading edge and under side of the aircraft wing 14, but other mounting arrangements may be used.

Although the pylon 10 is shown in the figures and described herein as being configured to secure the aircraft engine 12 to the aircraft wing 14, embodiments of the present invention may secure an externally mounted system, such as a fuel tank, a sensor pod, an expendable ordnance, or the like, to the aircraft wing 14 or aircraft fuselage.

Figure 2:
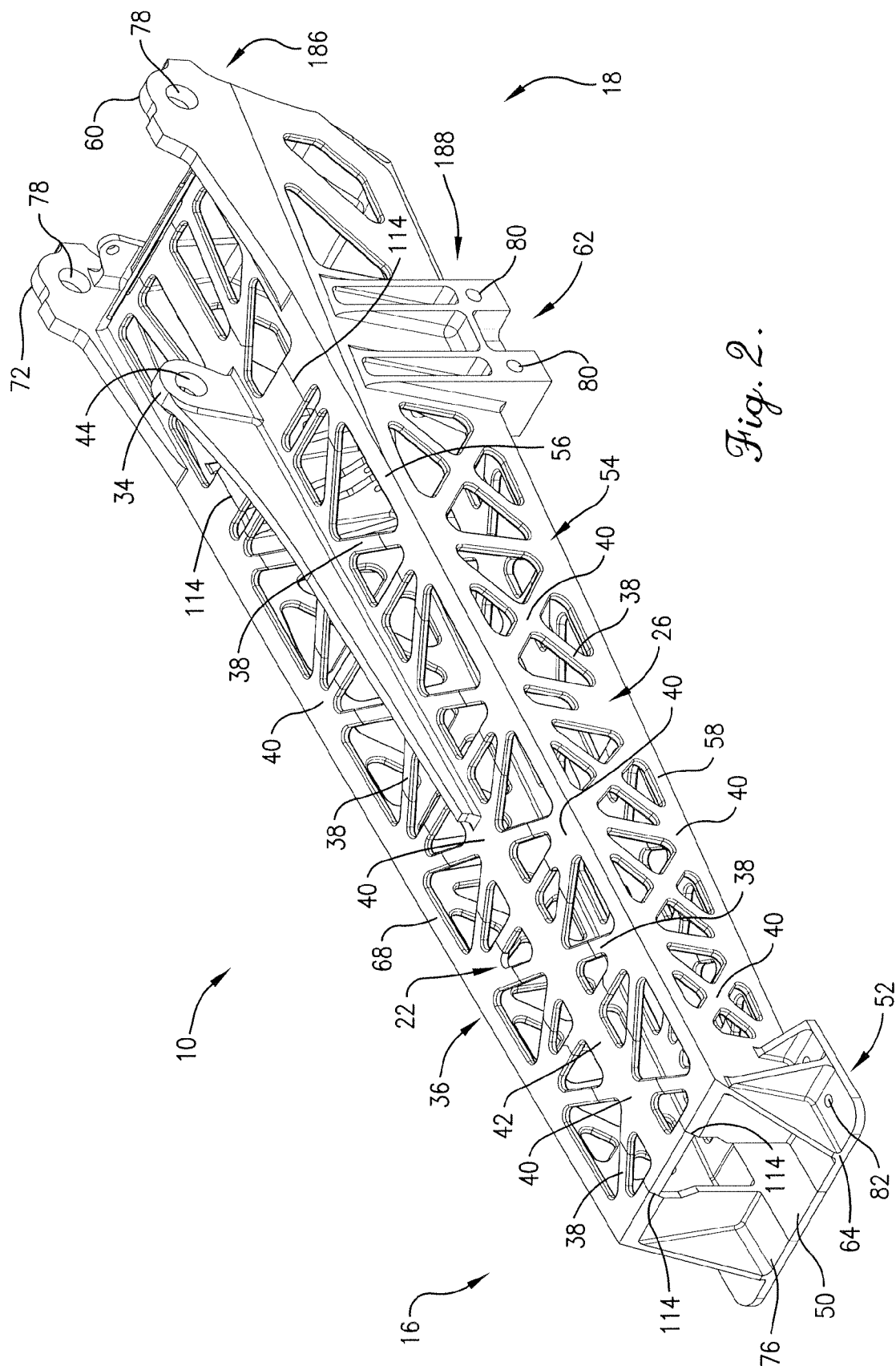
FIG. 2 is a perspective view from the forward end of the pylon.
Figure 3:
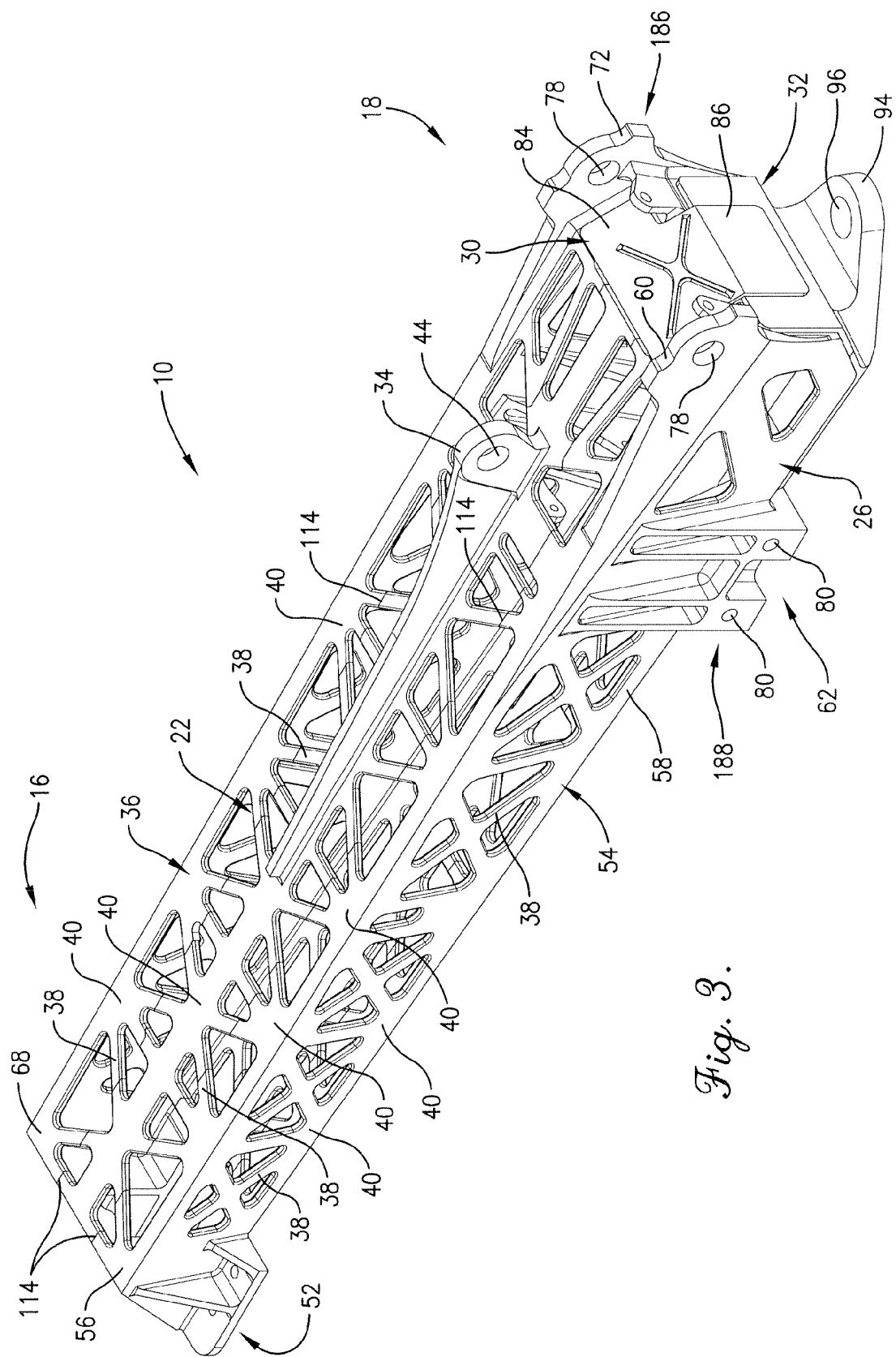
FIG. 3 is a perspective view from the aft end of the pylon.
Figure 4:
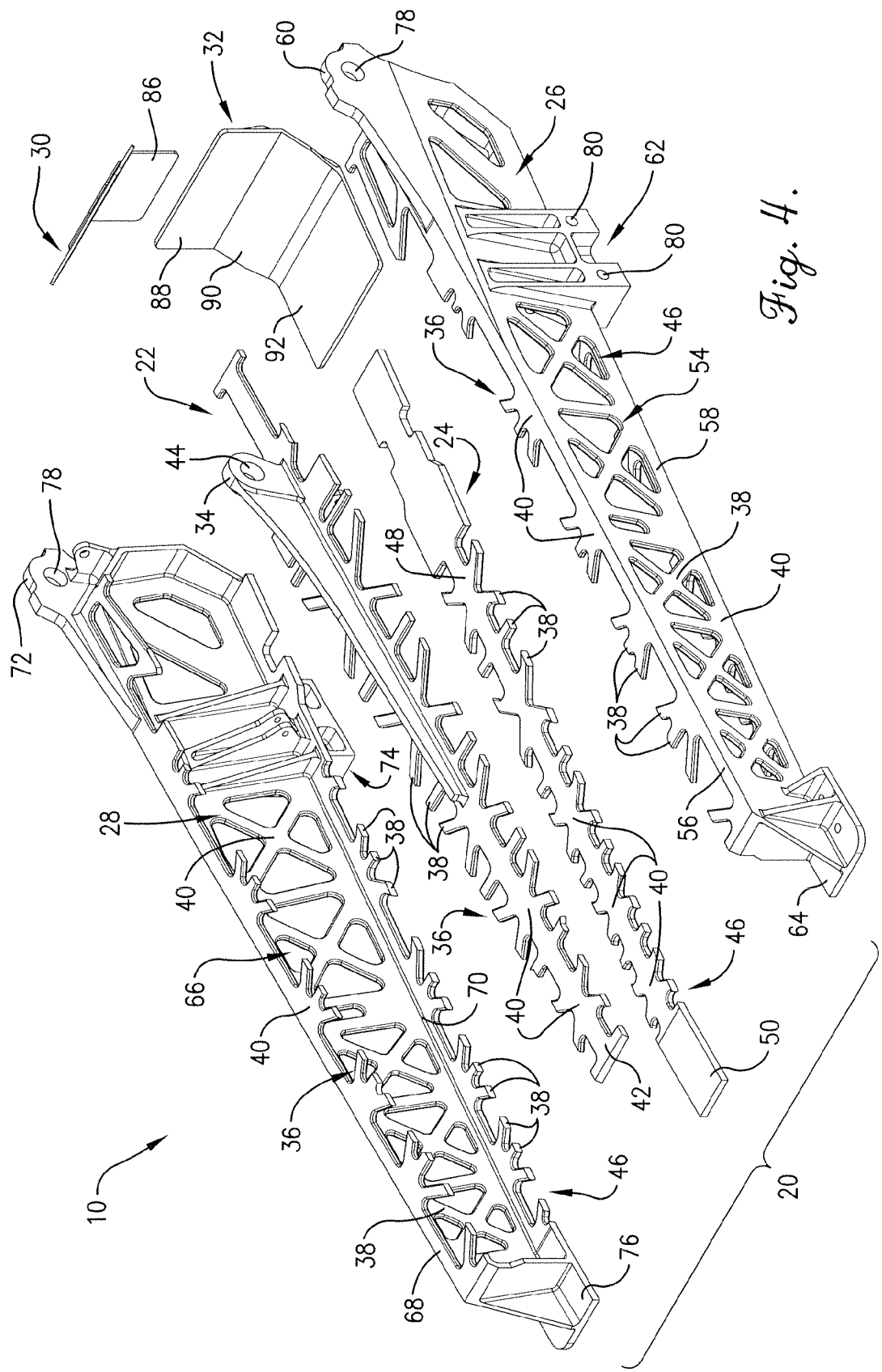
FIG. 4 is an exploded view of the pylon showing a top wall, a bottom wall, a left side wall, a right side wall, an upper closeout fitting, and a lower closeout fitting.

A first embodiment of the pylon 10 is shown in FIGS. 2-4 and may be of a generally elongated box shape with a forward portion 16 and an aft portion 18 and further may have a transverse cross-sectional shape of an isosceles trapezoid or a rectangle, in some embodiments. As best shown in FIG. 4, the pylon 10 may be constructed from separately produced components 20 that broadly comprise a top wall 22, a bottom wall 24, a left side wall 26, a right side wall 28, an upper closeout fitting 30, and a lower closeout fitting 32. The pylon 10 generally requires high strength and light weight and accordingly the components 20 may be manufactured from a material such as titanium or titanium alloys like Ti-6Al-4V.

The top wall 22 generally provides mechanical strength and support for an upper wing attachment lug 34 that is coupled to the upper surface of the top wall 22. The top wall 22 may include at least a portion of an upper truss structure 36 that includes a plurality of straight, slender truss members 38. The truss members 38 may intersect and be coupled to one another by a plurality of truss nodes 40, such that each truss node 40 may receive a portion of the truss members 38. The top wall 22 may also include a top central rail 42 that is positioned in line with the longitudinal axis of the pylon 10 and along which may be located a portion of the truss nodes 40.

The upper wing attachment lug 34 generally provides a connection from the pylon 10 to the leading edge of the aircraft wing 14. The upper wing attachment lug 34 may be connected to the top central rail 42 and may protrude upward with a slender width and increasing height extending in the aft direction. The upper wing attachment lug 34 may also include an opening 44 which couples to the aircraft wing 14.

The bottom wall 24 may possess a similar structure to the top wall 22 and may include a portion of a lower truss structure 46 with a bottom central rail 48 and a plurality of truss members 38 coupled together by a plurality of truss nodes 40. The bottom wall 24 may also include a central portion 50 of a forward engine attachment interface 52 positioned near the forward edge of the bottom wall 24.

The left side wall 26 may include a left truss structure 54 which may be coupled to a left upper side rail 56 and a left lower side rail 58. The left truss structure 54 may also include a plurality of truss members 38 coupled together by a plurality of truss nodes 40. The left upper side rail 56 and the left lower side rail 58 may be positioned in line with the longitudinal axis of the pylon 10 and may be coupled with the plurality of truss nodes 40 of the left side wall 26. Further coupled along the length of the left upper side rail 56 and the left lower side rail 58 may be several truss nodes 40 from the top wall 22 and the bottom wall 24, such that the left side wall 26 retains a portion of each of the truss nodes 40 from the top wall 22 and the bottom wall 24 coupled thereto.

A left aft wing attachment lug 60 may be coupled at the aft end of the left upper side rail 56. A pair of left aft engine attachment lugs 62 may be coupled to the aft section of the left side wall 26. Coupled to the forward end of the left lower side rail 58 may be a left portion 64 of the forward engine attachment interface 52.

The right side wall 28 may be substantially the mirror image of the left side wall 26 and may include a right truss structure 66 which may be coupled to a right upper side rail 68 and a right lower side rail 70. The right truss structure 66 may also include a plurality of truss members 38 coupled together by a plurality of truss nodes 40. The right upper side rail 68 and the right lower side rail 70 may be positioned in line with the longitudinal axis of the pylon 10 and may be coupled with the plurality of truss nodes 40 of the right side wall 28. Further coupled along the length of the right upper side rail 68 and the right lower side rail 70 may be several truss nodes 40 from the top wall 22 and the bottom wall 24, such that the left side wall 26 retains a portion of each of the truss nodes 40 from the top wall 22 and the bottom wall 24 coupled thereto.

A right aft wing attachment lug 72 may be coupled at the aft end of the right upper side rail 68. A pair of right aft engine attachment lugs 74 may be coupled to the aft section of the right side wall 28. Coupled to the forward end of the right lower side rail 70 may be a right portion 76 of the forward engine attachment interface 52.

The left aft wing attachment lug 60 and the right aft wing attachment lug 72 generally protrude aftward from the pylon 10 and may both include an opening 78, such that the two openings 78 are in alignment. Through the two openings 78, the pylon 10 may couple to a portion of the aircraft wing 14.

The left aft engine attachment lugs 62 and the right aft engine attachment lugs 74 generally couple the pylon 10 to the aft region of the aircraft engine 12. These lugs 62, 74 may include a plurality of holes 80 through which the engine 12 may be mounted.

The forward engine attachment interface 52, which comprises the left portion 64, the center portion 50, and the right portion 76, generally couples the pylon 10 to the central region of the aircraft engine 12. The forward engine attachment interface 52 may include a plurality of holes 82 near the left and right sides of the interface 52 through which the engine 12 may be mounted.

The upper closeout fitting 30 generally couples to the upper portion of the aft section of the top wall 22, the left side wall 26, and the right side wall 28. The upper closeout fitting 30 may include an upper plate 84 coupled to a lower plate 86 at an angle therebetween. The upper plate 84 may include a larger rectangular shape coupled on one side to a smaller rectangular shape. The lower plate 86 may be of the smaller rectangular shape, such that the combination of the upper plate 84 and the lower plate 86 forms a "T" shape.

The lower closeout fitting 32 generally couples to the central and lower portions of the aft section of the left side wall 26 and the right side wall 28, as well as the aft portion of the bottom wall 24. The lower closeout fitting 32 may include an upper section 88 coupled at an angle to a middle section 90 coupled at an angle in turn to a lower section 92. The upper section 88 may also be attached to the lower plate 86 of the upper closeout fitting 30. The lower section 92 may couple to the aft portion of the bottom wall 24. The middle section 90 may also include a lower wing attachment lug 94 protruding in the aft direction. The lower wing attachment lug 94 may include an opening 96 through which the pylon 10 may be attached to the aircraft wing 14.

Figure 17:
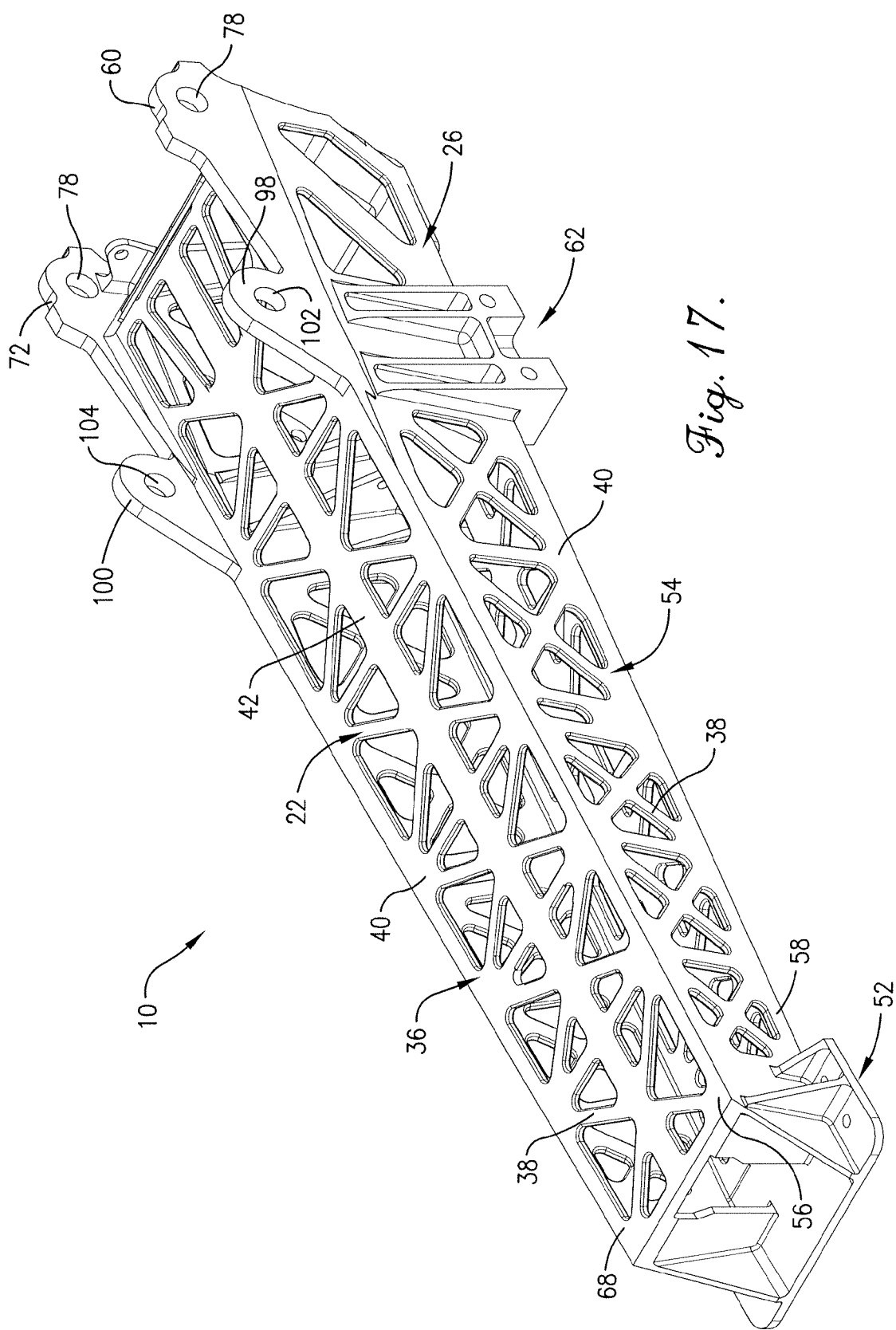
FIG. 17 is a perspective view from the forward end of a second embodiment of the pylon.
Figure 18:
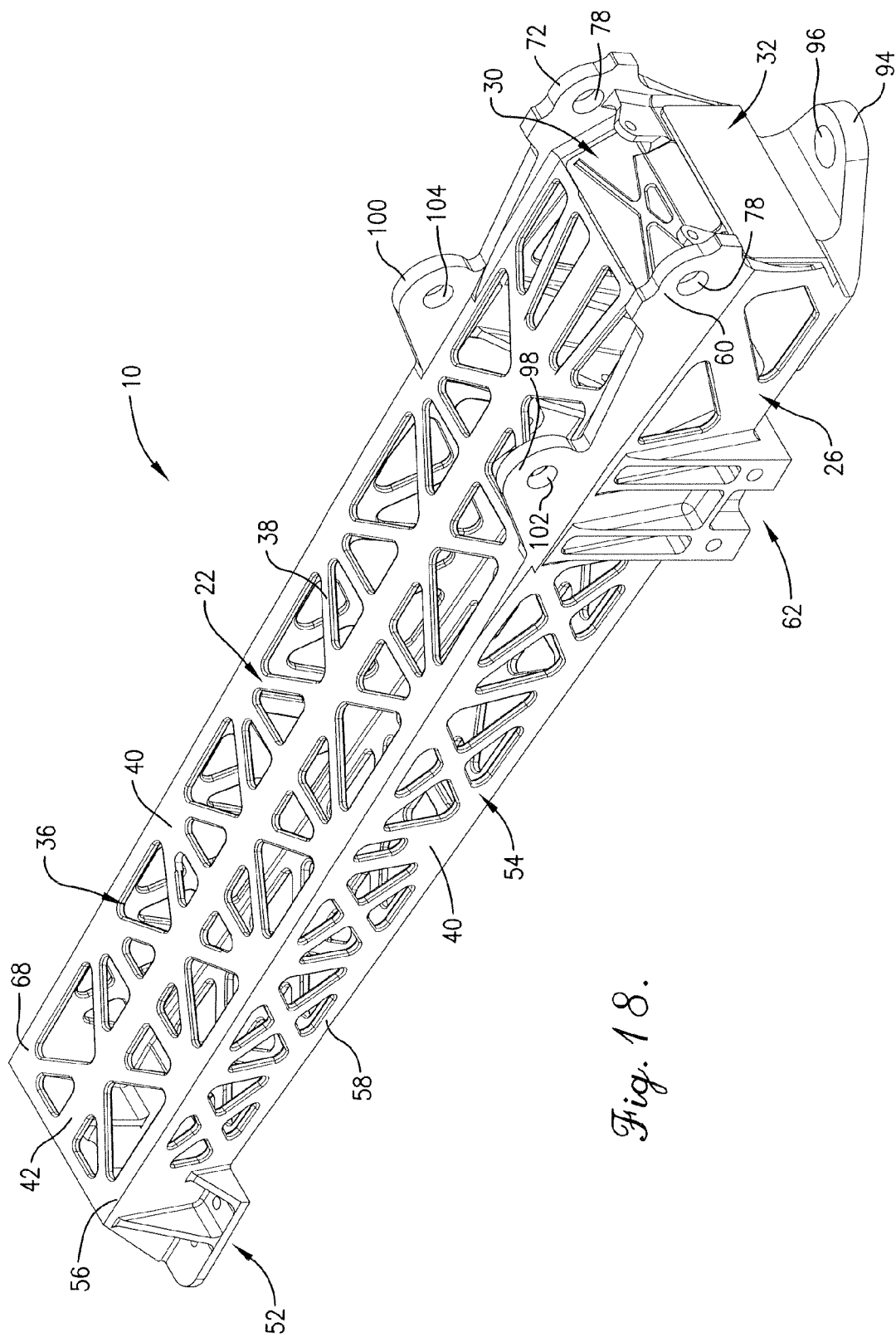
FIG. 18 is a perspective view from the aft end of the second embodiment of the pylon.

In a second embodiment, as shown in FIGS. 17-18, the pylon 10 may include a left forward wing attachment lug 98 and a right forward wing attachment lug 100 instead of the upper wing attachment lug 34 as described above. The left forward wing attachment lug 98 may be coupled to the left upper side rail 56, and may include an opening 102 which provides a first connection from the pylon 10 to the leading edge of the aircraft wing 14. The right forward wing attachment lug 100 may be coupled to the right upper side rail 68, and may include an opening 104 which provides a second connection from the pylon 10 to the leading edge of the aircraft wing 14. Furthermore, in various embodiments, since the upper wing attachment lug 34 is not present and support of that load is not necessary, then the top central rail 42 and the bottom central rail 48 may not be present as well.

The components 20 of the aircraft engine pylon 10—the top wall 22, the bottom wall 24, the left side wall 26, and the right side wall 28—may be joined together to form the pylon 10. The joining process may include welding of the components 20 together using electron-beam welding or similar welding techniques for use with titanium and titanium alloys. The upper closeout fitting 30 and the lower closeout fitting 32 may be joined to the pylon 10 by welding or by fastening.

Generally, the left side wall 26 and the right side wall 28 are formed to include the left truss structure 54 and the right truss structure 66, respectively. The forming may include casting, forging, machining, or the like. The left side wall 26 may also include the left upper side rail 56 and the left lower side rail 58. Likewise, the right side wall 28 may include the right upper side rail 68 and the right lower side rail 70.

In addition, the left side wall 26 may include a left upper ledge 106 coupled to the left upper side rail 56 and a left lower ledge 108 coupled to the left lower side rail 58. The left upper ledge 106 and the left lower ledge 108 may be substantially planar and may extend from the left side wall 26 a short length toward the center of the pylon 10. The left upper ledge 106 may generally align with the top wall 22, and the left lower ledge 108 may generally align with the bottom wall 24. The right side wall 28 may include a right upper ledge 110 and a right lower ledge 112 that are generally the mirror image of the left upper ledge 106 and the left lower ledge 108. Accordingly, the right upper ledge 110 may generally align with the top wall 22 and the right lower ledge 112 may generally align with the bottom wall 24.

Figure 5:
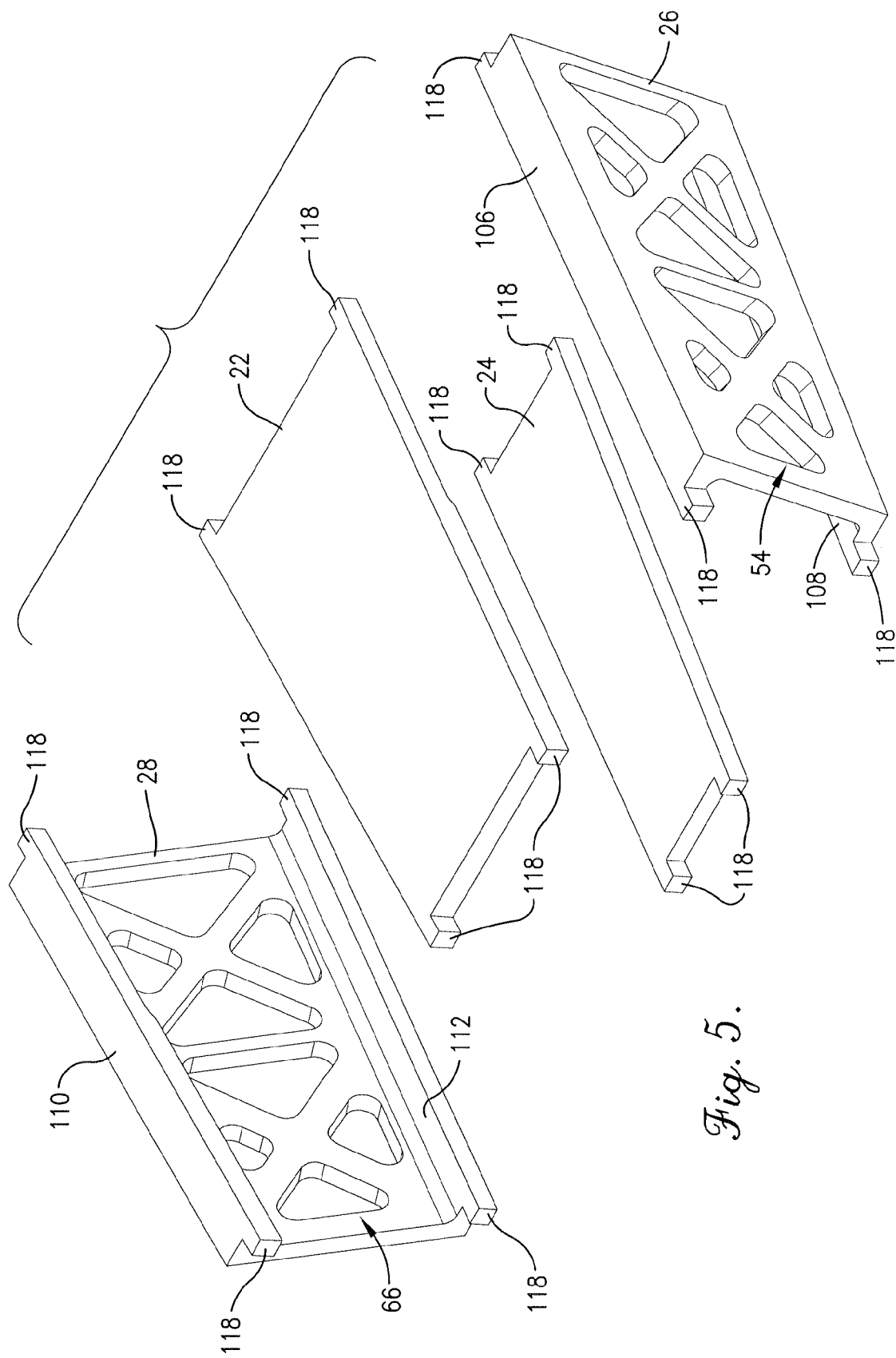
FIG. 5 is an exploded view of a portion of the pylon showing a solid top wall with a plurality of tabs, a solid bottom wall with a plurality of tabs, the left side wall including a left upper ledge and a left lower ledge both with tabs at opposing ends, and the right side wall including a right upper ledge and a right lower ledge both with tabs at opposing ends.
Figure 6:
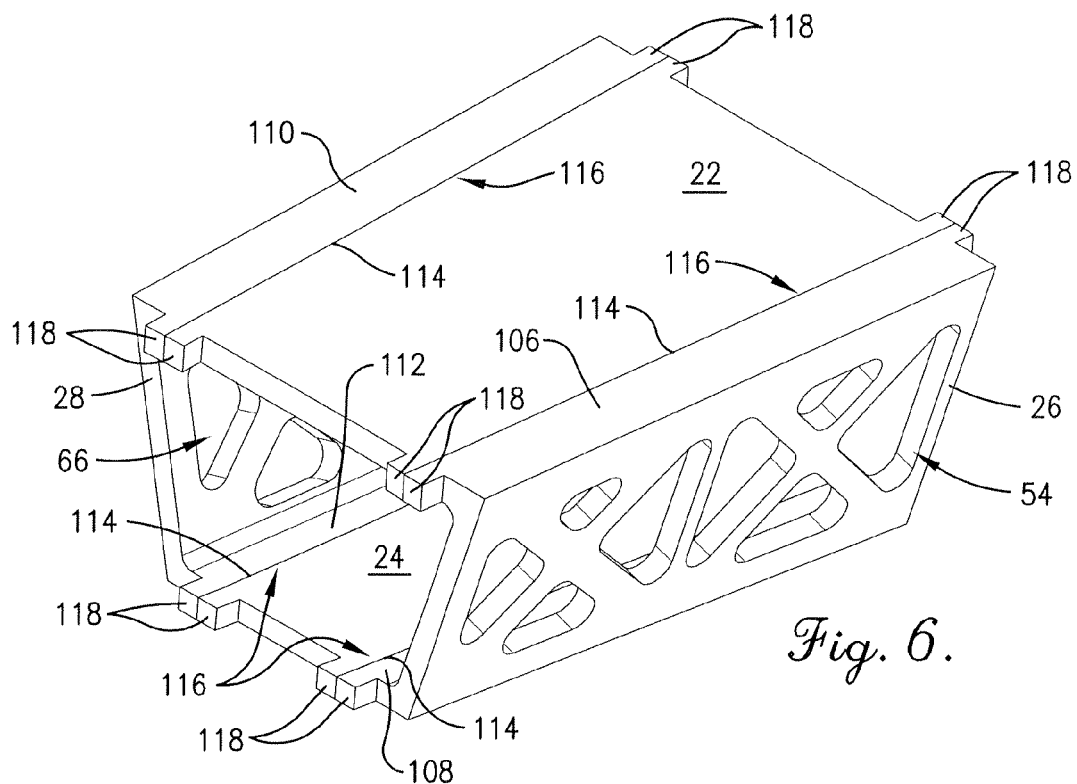
FIG. 6 is a perspective view of the portion of the pylon of FIG. 5 with the top wall, the left side wall, the right side wall, and the bottom wall all joined together with one joint between any two adjacent walls.
Figure 7:
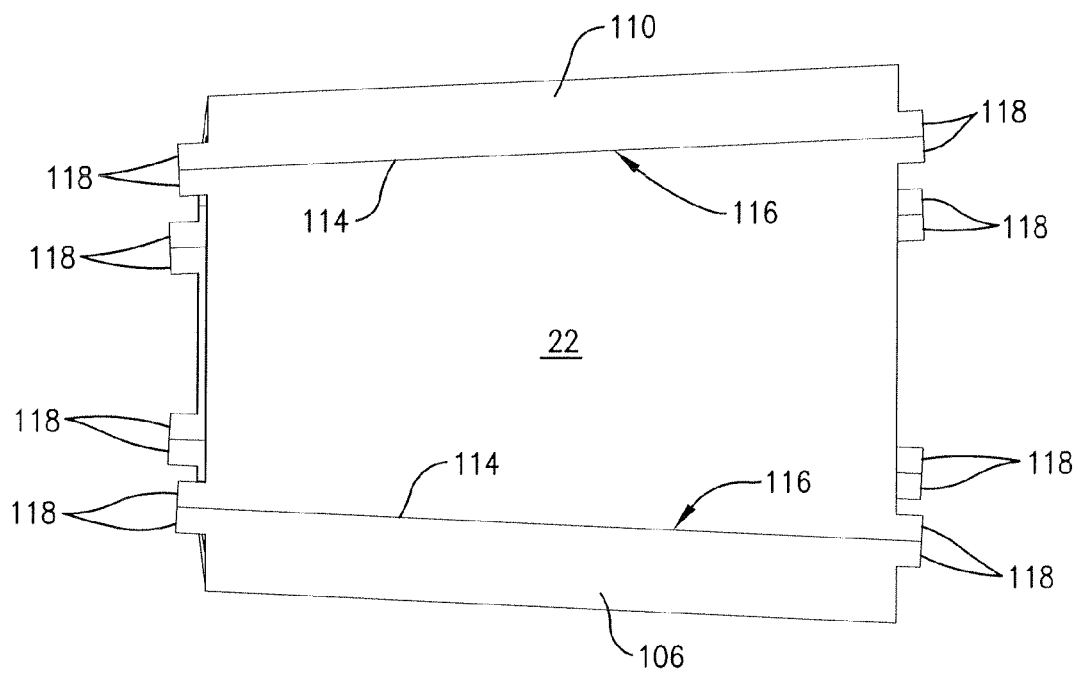
FIG. 7 is a top view of the pylon of FIG. 6.

In certain embodiments, the top wall 22 and the bottom wall 24 may be formed to be generally planar solid slabs of material as shown in FIG. 5. The left side of the top wall 22 may be positioned in alignment with and joined with the left upper ledge 106, as seen in FIGS. 6-7. The right side of the top wall 22 may be positioned in alignment with and joined with the right upper ledge 110. The left side of the bottom wall 24 may be positioned in alignment with and joined with the left lower ledge 108. The right side of the bottom wall 24 may be positioned in alignment with and joined with the right lower ledge 112. The joining process, which may include welding, generally results in a plurality of joints 114, that are located along joint lines 116 at the interfaces where the four walls 22, 24, 26, 28 are joined. In such embodiments, there may be one joint 114 per joint line 116 for a total of four joints 114. Since the left side wall 26 and the right side wall 28 are formed with ledges 106, 108, 110, 112 that extend away from the left side wall 26 and the right side wall 28, the joints 114 occur away from the left upper side rail 56, the left lower side rail 58, the right upper side rail 68, and the right lower side rail 70, which is where structural loading of the pylon 10 may occur.

Figure 8:
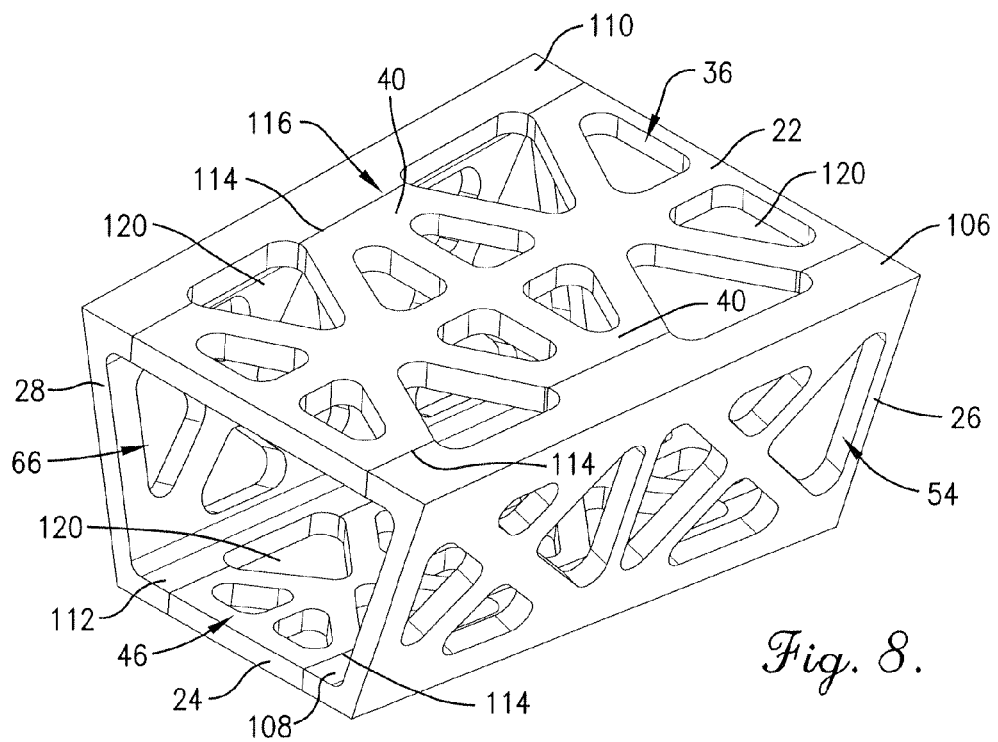
FIG. 8 is a perspective view of the pylon of FIG. 6 further including an upper truss structure and a lower truss structure.
Figure 9:
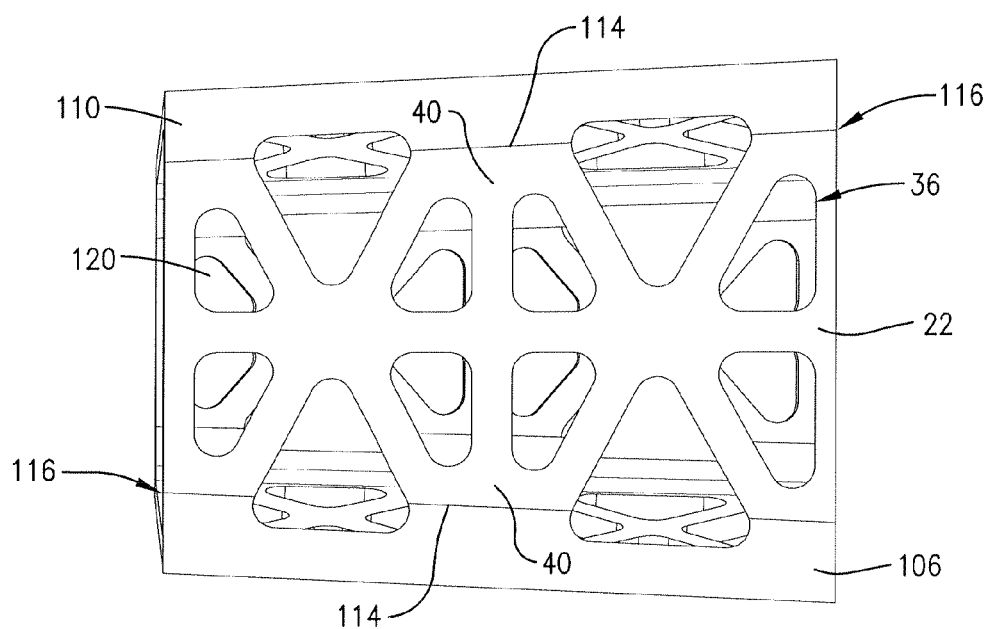
FIG. 9 is a top view of the pylon of FIG. 8.

After the top wall 22 and the bottom wall 24 are joined to the left side wall 26 and the right side wall 28, the top wall 22, the left upper ledge 106, and the right upper ledge 110 may be machined to form the upper truss structure 36. Additionally, the bottom wall 24, the left lower ledge 108, and the right lower ledge 112 may be machined to form the lower truss structure 46. In various embodiments, the upper truss structure 36 and the lower truss structure 46 may be formed such that the truss nodes 40 located in the ledges 106, 108, 110, 112 and the space in between the truss nodes 40 are positioned along the joint lines 116, as seen in FIGS. 8-9. As a result, the joints 114 between the top wall 22, the bottom wall 24, the left side wall 26, and the right side wall 28 are isolated to the truss node 40 locations, such that failure of a joint 114 remains isolated to the loss of a single truss node 40. In contrast, if the sides of the pylon 10 were joined together along the rails, 56, 58, 68, 70, the failure of a single joint may lead to the separation of two sides of the pylon 10 and in turn to the failure of the pylon 10.

In other embodiments, after the joining process, the upper truss structure 36 and the lower truss structure 46 may be formed, for example by machining, such that the joint lines 116 may be positioned along the truss members 38 connected to the truss nodes 40 located in the ledges 106, 108, 110, 112, as seen in FIGS. 2-4. Consequently, the joints 114 between the top wall 22, the bottom wall 24, the left side wall 26, and the right side wall 28 are further isolated to the truss members 38, such that failure of a joint 114 remains isolated to the loss of a single truss member 38.

In various embodiments, the top wall 22, the bottom wall 24, the left upper ledge 106, the left lower ledge 108, the right upper ledge 110, and the right lower ledge 112 may all be formed to include an extending tab 118 that protrudes longitudinally where the four walls 22, 24, 26, 28 are joined. The tab 118 may be an integral part of the walls 22, 24 and the ledges 106, 108, 110, 112, as seen in FIGS. 5-7, that is utilized for the joining process and then is machined away afterwards.

Figure 10:
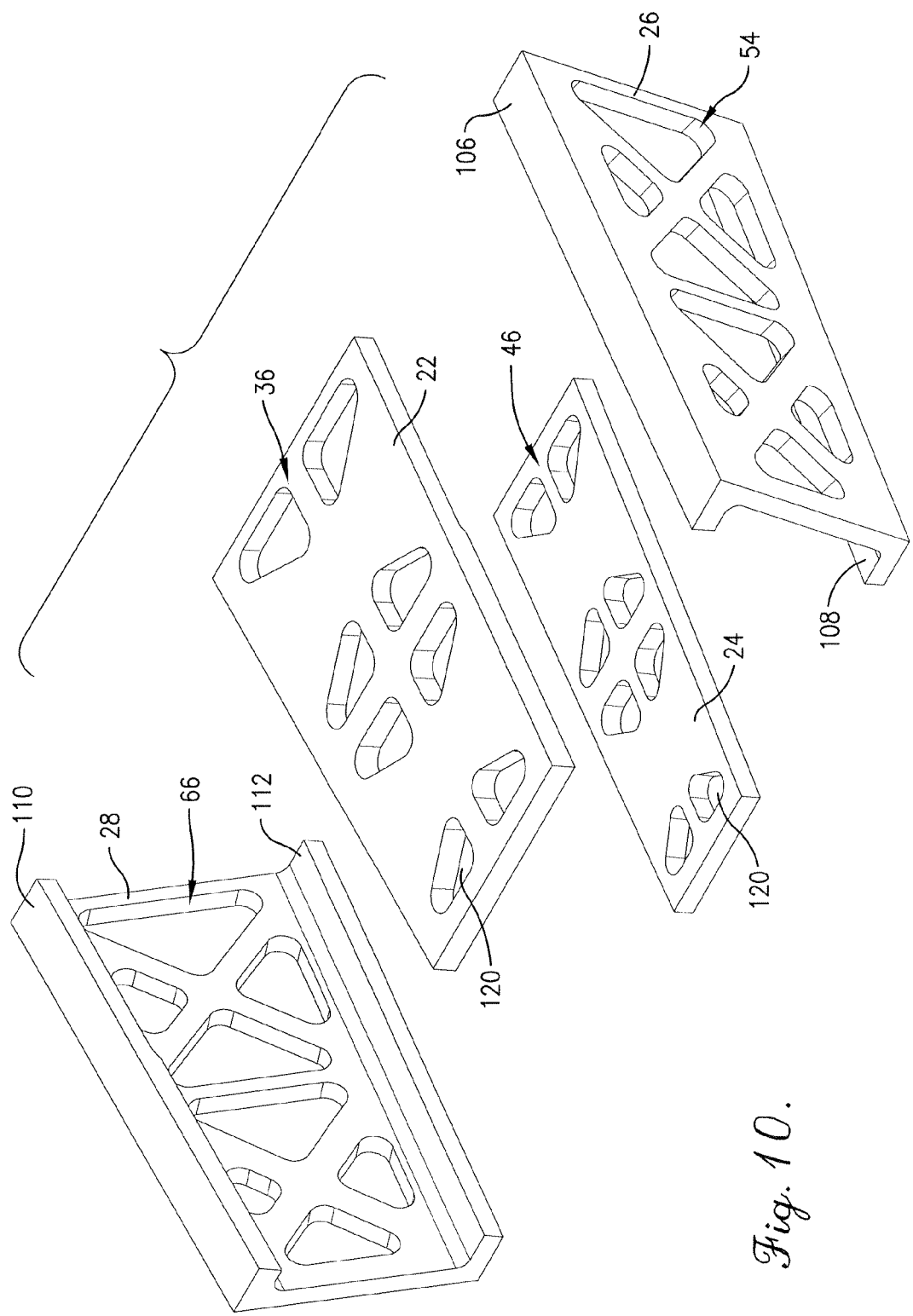
FIG. 10 is an exploded view of the portion of the pylon of FIG. 5 further including a portion of the upper truss structure formed in the top wall and a portion of the lower truss structure formed in the bottom wall.
Figure 11:
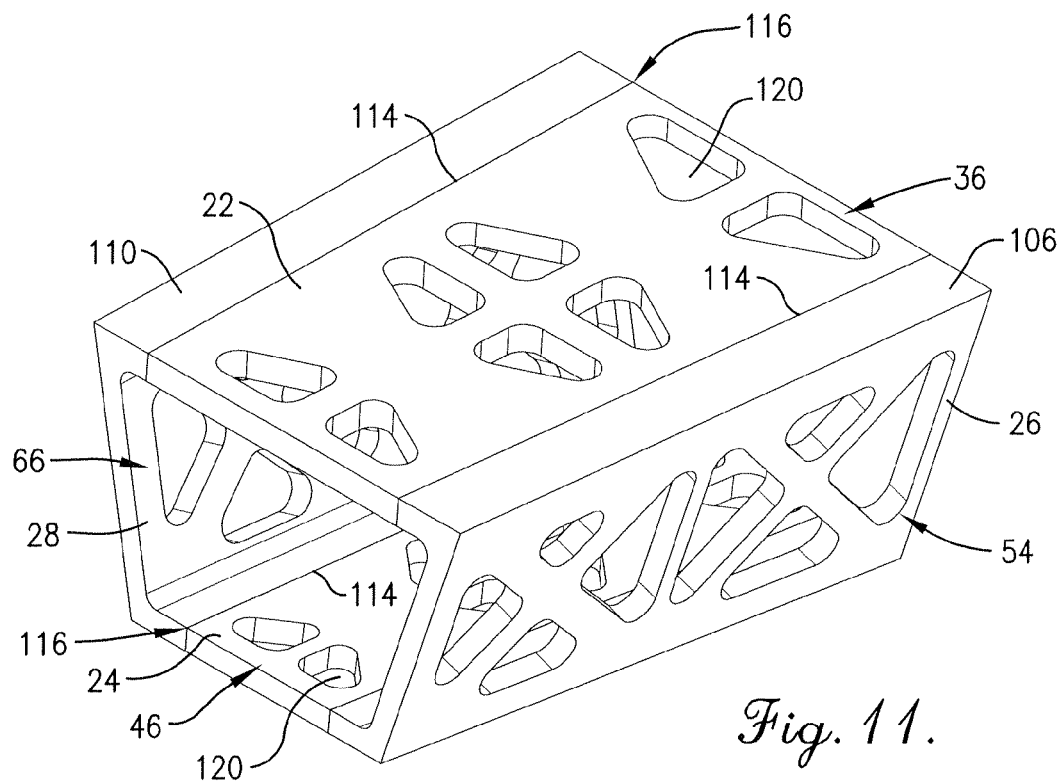
FIG. 11 is a perspective view of the portion of the pylon of FIG. 10 with the top wall, the left side wall, the right side wall, and the bottom wall all joined together with one joint between any two adjacent walls.
Figure 12:
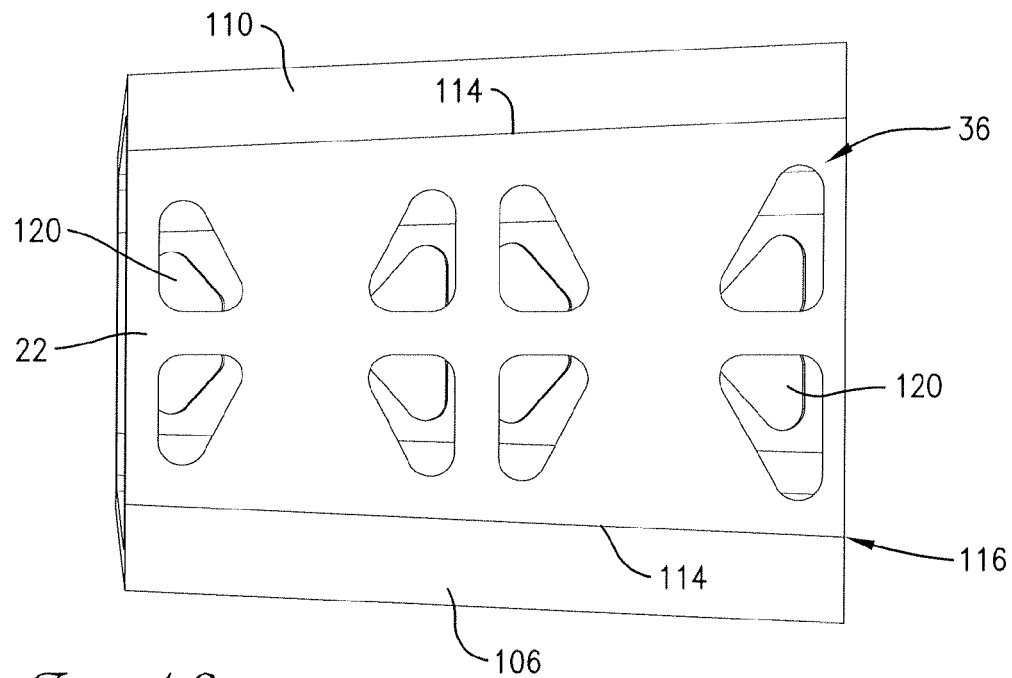
FIG. 12 is a top view of the pylon of FIG. 11.

In some embodiments, the top wall 22 and the bottom wall 24 may be formed to include portions of the upper truss structure 36 and the lower truss structure 46, as shown in FIGS. 10-12. A plurality of holes 120 may be cut, machined, or cast into the top wall 22 and the bottom wall 24 before the joining process. The holes 120 may be cut to form those portions of the upper truss structure 36 and the lower truss structure 46 that do not cross the joint lines 116. Thus, the top wall 22 and the bottom wall 24 may be joined to the left side wall 26 and the right side wall 28 with four continuous joint lines 116. Then, additional holes 120 may be cut into the top wall 22 and the bottom wall 24 to form the truss nodes 40 along the ledges 106, 108, 110, 112 and the spaces therebetween. These embodiments may or may not include the tabs 118, as described above.

Figure 13:
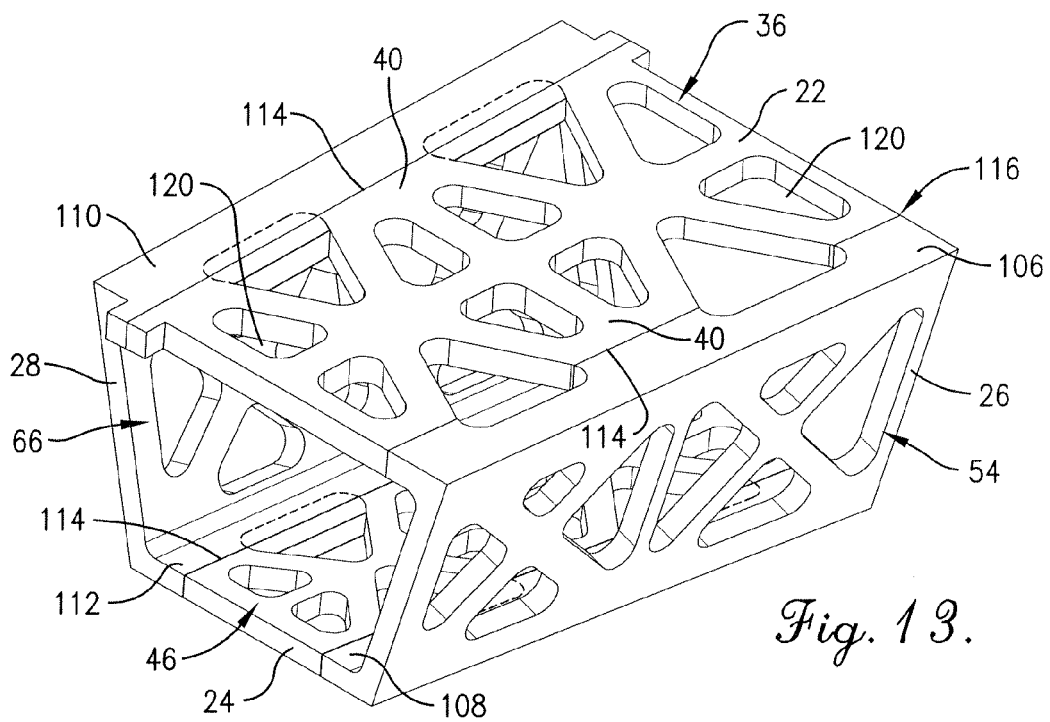
FIG. 13 is a perspective view of the portion of the pylon of FIG. 11 further including a greater portion of the upper truss structure formed in the top wall and a greater portion of the lower truss structure formed in the bottom wall.
Figure 14:
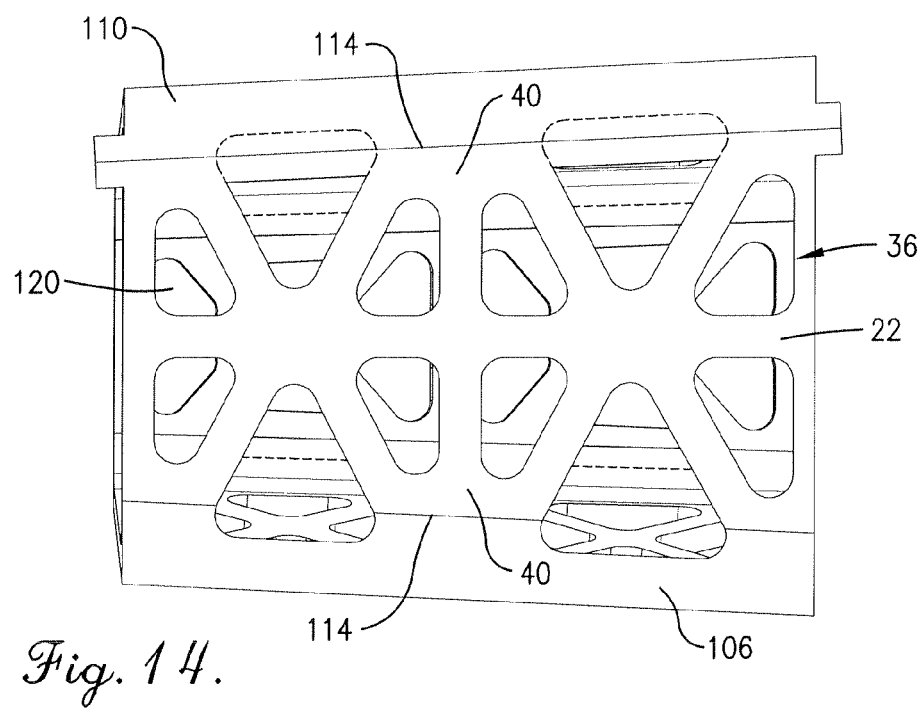
FIG. 14 is a top view of the pylon of FIG. 13.

In various embodiments, the top wall 22 and the bottom wall 24 may be formed to include a majority of the upper truss structure 36 and the lower truss structure 46, as shown in FIGS. 13-14. The holes 120 in the top wall 22 and the bottom wall 24 that are adjacent to the left side wall 26 and the right side wall 28 may be machined, cut, or cast to within a small distance from the joint lines 116, such that the top wall 22 and the bottom wall 24 may include a sacrificial joint material 122 in these areas. Thus, the top wall 22 and the bottom wall 24 may be joined to the left side wall 26 and the right side wall 28 with four continuous joint lines 116. After joining, the holes 120 in the top wall 22 and the bottom wall 24 that are adjacent to the left side wall 26 and the right side wall 28 may be further machined or cut to remove the sacrificial joint material 122 thereby forming the truss nodes 40 and the spaces therebetween. These embodiments may or may not include the tabs 118, as described above.

Figure 15:
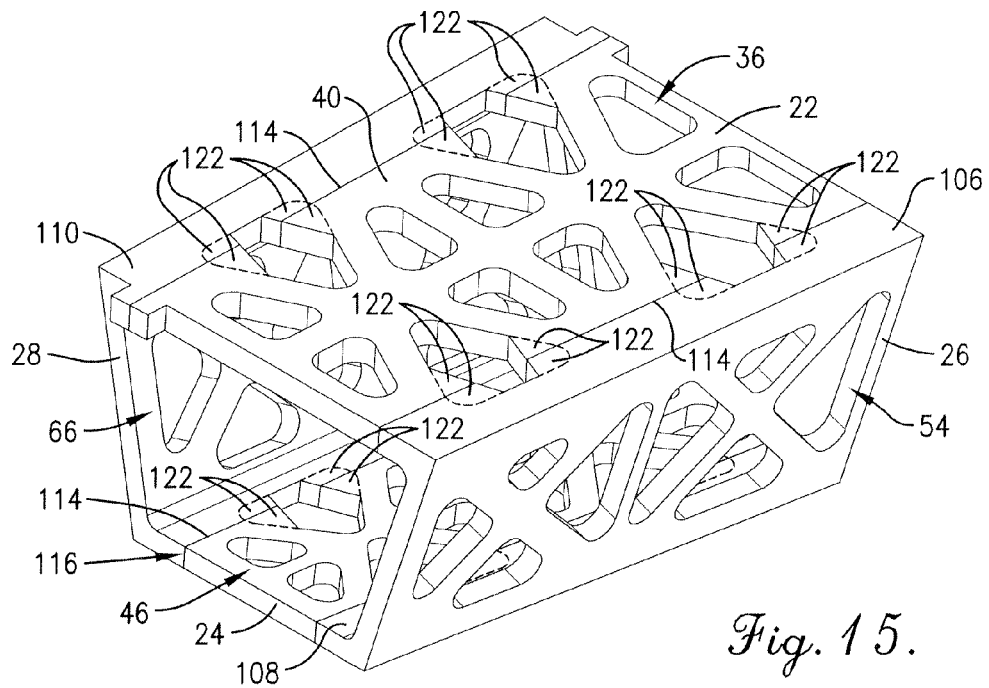
FIG. 15 is a perspective view of the portion of the pylon of FIG. 13 further including a portion of the upper truss structure formed in the upper left ledge and the upper right ledge and a portion of the lower truss structure formed in the lower left ledge and the lower right ledge.
Figure 16:
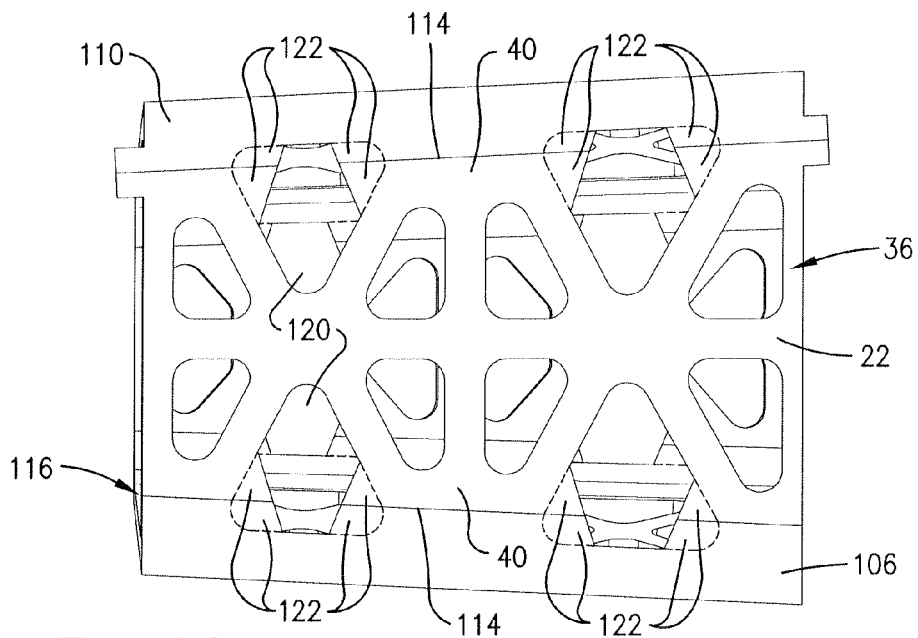
FIG. 16 is a top view of the pylon of FIG. 15.

In other embodiments similar to those discussed above, the holes 120 in the top wall 22 and the bottom wall 24 that are adjacent to the left side wall 26 and the right side wall 28 may be machined, cut, or cast to include a substantial portion, but not all, of the space between the truss nodes 40, as shown in FIGS. 15-16. Accordingly, only a small portion of sacrificial joint material 122 may be present directly adjacent to the truss nodes 40. In these embodiments, a plurality of joints 114 may occur along each joint line 116, as opposed to one joint 114 for each joint line 116 in the embodiments described above. After the joining process, the sacrificial joint material 122 may be removed. Furthermore, these embodiments may or may not include the tabs 118, as described above.

In yet other embodiments, the left side wall 26 and the right side wall 28 may be formed to include a substantial portion of truss members 38 of the upper truss structure 36 and the lower truss structure 46, as shown in FIGS. 2-4. The top wall 22 may include a portion of the upper truss structure 36, and the bottom wall 24 may include a portion of the lower truss structure 46. The left side wall 26 and the right side wall 28 may be joined to the top wall 22 and the bottom wall 24 with a plurality of joints 114 being made along each of the four joint lines 116. The joints 114 occur along the truss members 38 of the upper truss structure 36 and the lower truss structure 46. As discussed above, this approach isolates the failure of a joint 114 to a single truss member 38.

In various embodiments discussed above, wing attachment lugs, such as the left aft wing attachment lug 60 or the right aft wing attachment lug 72, and engine attachment lugs, such as the left aft engine attachment lug 62 or the right aft engine attachment lug 74, may be included with one or more of the walls 22, 24, 26, 28 of the pylon 10. The lugs may be formed by casting, machining, joining, or fastening.

Figure 19:
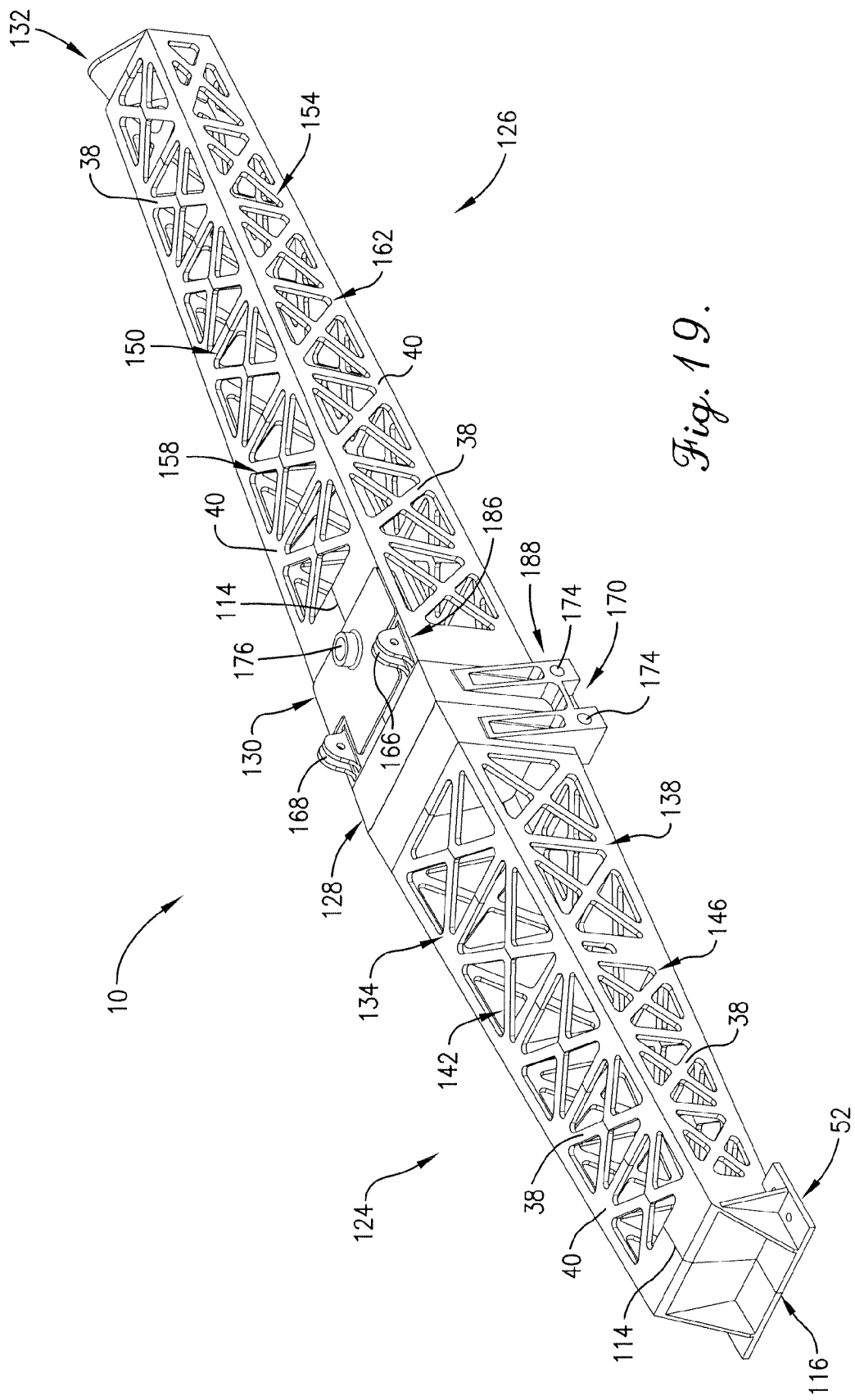
FIG. 19 is a perspective view from the forward end of a third embodiment of the pylon.
Figure 20:
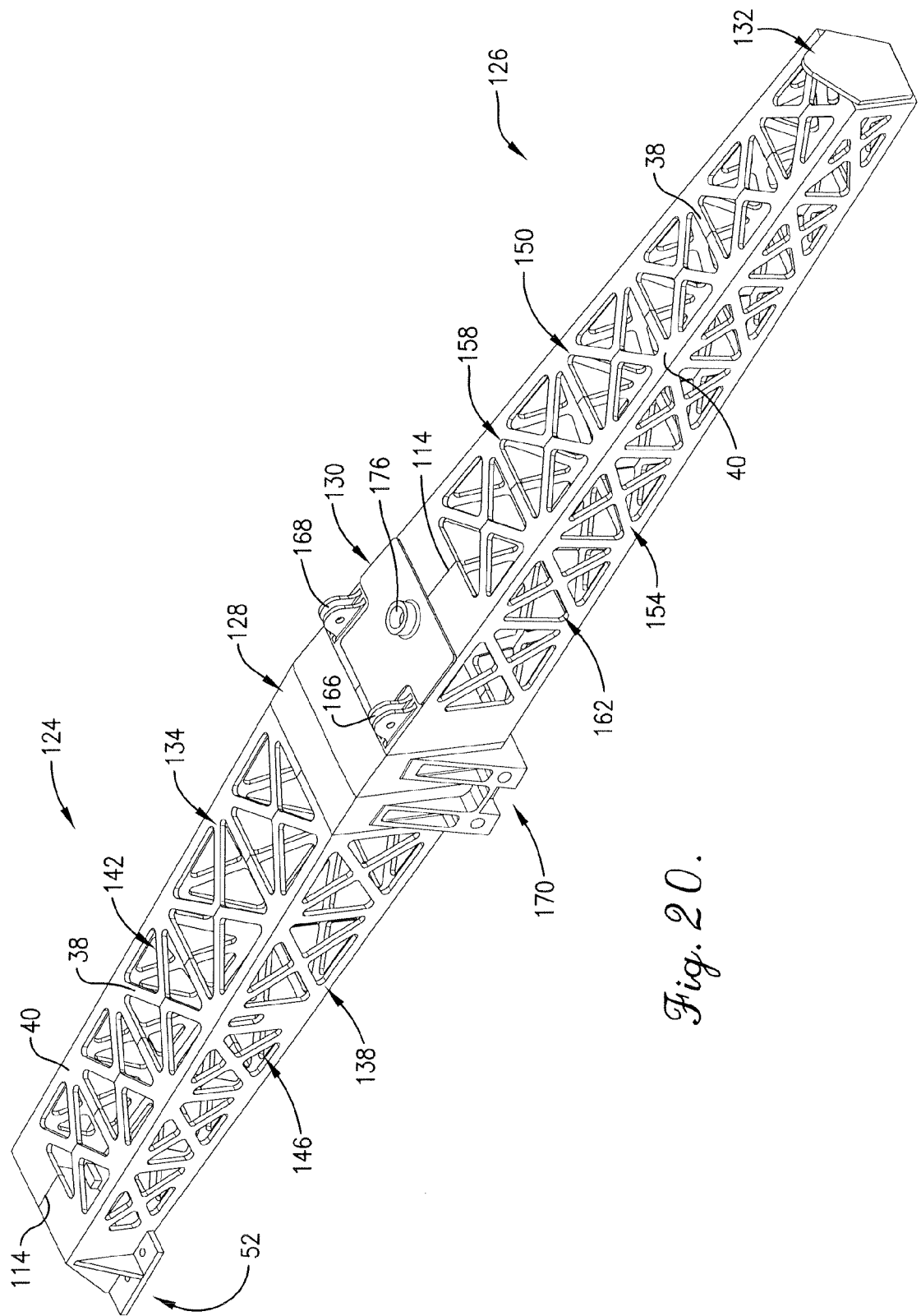
FIG. 20 is a perspective view from the aft end of the third embodiment of the pylon.
Figure 21:
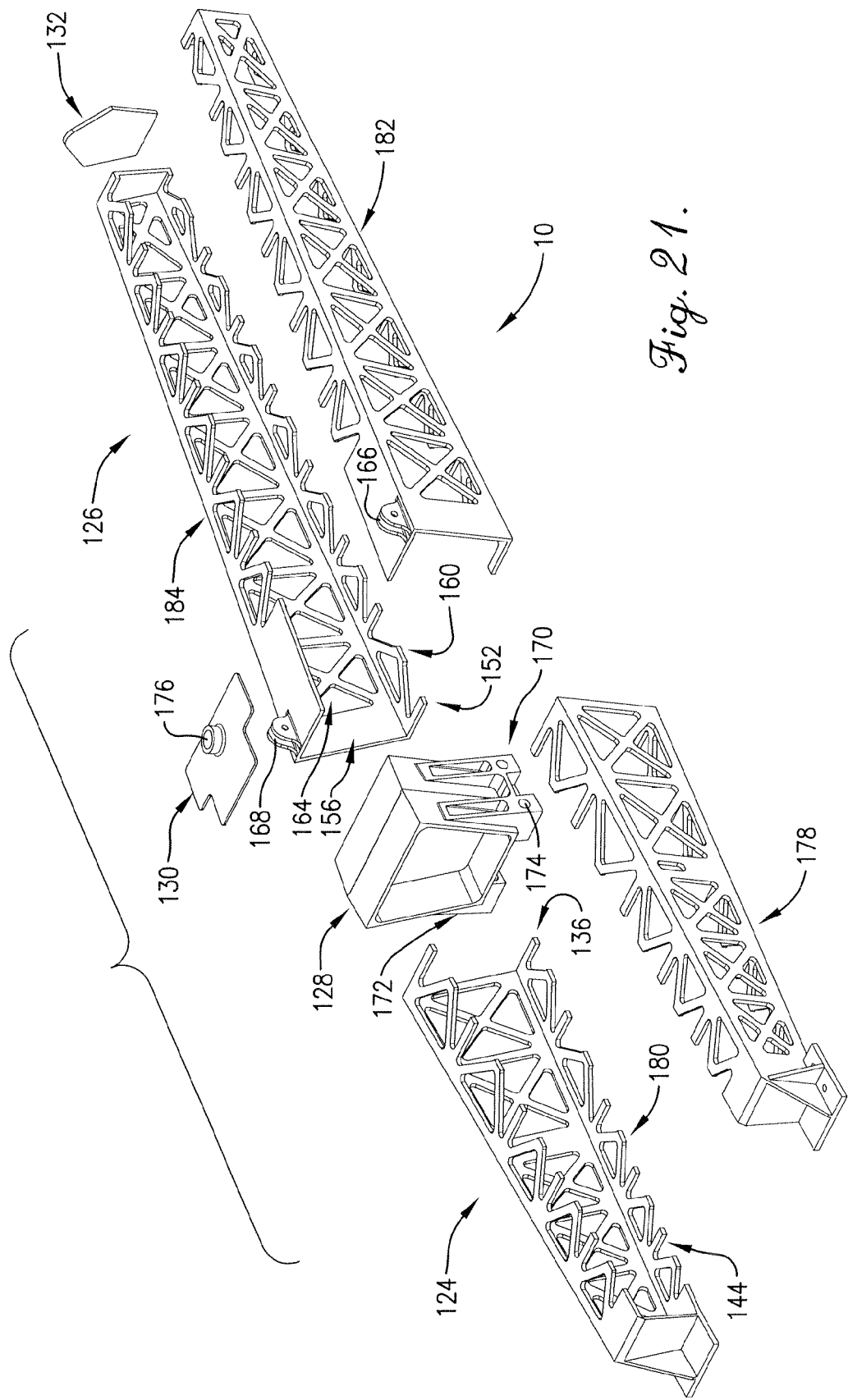
FIG. 21 is an exploded view of the third embodiment of the pylon.

In a third embodiment shown in FIGS. 19-21, the pylon 10 may comprise a forward truss unit 124, an aft truss unit 126, a central engine mount interface 128, a spigot fitting 130, and an aft wing attachment fitting 132.

The forward truss unit 124 generally provides support for coupling the pylon 10 to the engine 12. The forward truss unit 124 may be of a generally elongated box shape with a transverse cross-sectional shape of an isosceles trapezoid or a rectangle. The forward truss unit 124 may include a forward top wall 134, a forward bottom wall 136, a forward left side wall 138, and a forward right side wall 140. The forward top wall 134 may include a forward upper truss structure 142. The forward bottom wall 136 may include a forward lower truss structure 144. The forward left side wall 138 may include a forward left truss structure 146. The forward right side wall 140 may include a forward right truss structure 148. The forward engine attachment interface 52, as described above, may also be coupled to the leading edge of the forward truss unit 124.

The aft truss unit 126 generally provides support for coupling the pylon 10 to the aircraft wing 14. Like the forward truss unit 124, the aft truss unit 126 may be of a generally elongated box shape with a transverse cross-sectional shape of an isosceles trapezoid or a rectangle. The aft truss unit 126 may include an aft top wall 150, an aft bottom wall 152, an aft left side wall 154, and an aft right side wall 156. The aft top wall 150 may include an aft upper truss structure 158. The aft bottom wall 152 may include an aft lower truss structure 160. The aft left side wall 154 may include an aft left truss structure 162. The aft right side wall 156 may include an aft right truss structure 164. The aft truss unit 126 may also include a left wing attachment lug 166 coupled to the upper section of the forward portion of the aft left side wall 154 and a right wing attachment lug 168 coupled to the upper section of the forward portion of the aft right side wall 156. The left wing attachment lug 166 and the right wing attachment lug 168 generally couple the pylon 10 to the leading edge of the aircraft wing 14.

The central engine mount interface 128 generally couples the pylon 10 with an aft portion of the aircraft engine 12. The central engine mount interface 128 may be of rectangular block shape and a plurality of left engine attachment lugs 170 and a plurality of right engine attachment lugs 172. Each of the left engine attachment lugs 170 and the right engine attachment lugs 172 may include one or more openings 174 through which the central engine mount interface 128 may be physically attached to the aircraft engine 12. The central engine mount interface 128 may be coupled to the aft portion of the forward truss unit 124 and to the forward portion of the aft truss unit 126.

The spigot fitting 130 generally couples the pylon 10 to a portion of the aircraft wing 14. The spigot fitting 130 may be flat and relatively thin compared to its surface area with a generally "T" shape. The spigot fitting 130 may include an outward protruding cylindrically-shaped coupler 176 that engages the aircraft wing 14. The spigot fitting 130 may be coupled to the forward portion of the top wall 22.

The aft wing attachment fitting 132 generally couples the trailing edge of the pylon 10 to the mid to aft portion of the aircraft wing 14. The aft wing attachment fitting 132 may be flat and relatively thin compared to its surface area with a roughly pentagonal shape. The aft wing attachment fitting 132 may be coupled to the aft portion of the aft truss unit 126.

The forward truss unit 124 and the aft truss unit 126 may be joined to the central engine mount interface 128 to form the main structure of the pylon 10, as seen in FIG. 21. The joining process may include welding using electron-beam welding or similar welding techniques for use with titanium and titanium alloys. The spigot fitting 130 and the aft wing attachment fitting 132 may be joined to the pylon 10 by welding or by fastening.

The central engine mount interface 128, the spigot fitting 130, and the aft wing attachment fitting 132 may be formed by casting or machining titanium and/or titanium alloys. The forward truss unit 124 and the aft truss unit 126 comprise similar components to the first and second embodiments of the pylon 10 described above, and thus the forward truss unit 124 and the aft truss unit 126 may be formed and/or assembled in any of the ways described above. For example, the forward and aft left side walls 138, 154 and right side walls 140, 156 each may be formed with the appropriate truss structure and each may include upper and lower ledges 106, 108, 110, 112 that align with the forward and aft top and bottom walls 134, 150, 136, 152 for joining. After the four walls 134, 136, 138, 140 for the forward truss unit 124 are joined, then the forward top wall 22 and the forward bottom wall 24 may be machined as needed to complete the forward upper truss structure 36 and the forward lower truss structure 46. Likewise with the aft truss unit 126. The pylon 10 may further assembled by joining the forward truss unit 124 and the aft truss unit 126 to the central engine mount interface 128, as described above, with the spigot fitting 130 and the aft wing attachment fitting 132 being attached as well.

In various embodiments, the central engine mount interface 128, the spigot fitting 130, and the aft wing attachment fitting 132 may be formed as described above. However, the forward truss unit 124 and the aft truss unit 126 may be formed from two halves of each unit, as shown in FIG. 21. Thus, the forward truss unit 124 may include a left forward truss unit 178 and a right forward truss unit 180 that are formed by dividing the forward truss unit 124 along a vertical plane through the central longitudinal axis. Similarly, the aft truss unit 126 may include a left aft truss unit 182 and a right aft truss unit 184 that are formed by dividing the aft truss unit 126 along a vertical plane through the central longitudinal axis. The four half units 178, 180, 182, 184 may each be manufactured by casting them to be in their net shape. The two forward half units 178, 180 are joined to create the forward truss unit 124, and the two aft half units 182, 184 are joined to create the aft truss unit 126. Then, the pylon 10 is assembled by joining the forward truss unit 124, the aft truss unit 126, the central engine mount interface 128, the spigot fitting 130, and the aft wing attachment fitting 132 as discussed above.

Figure 22:
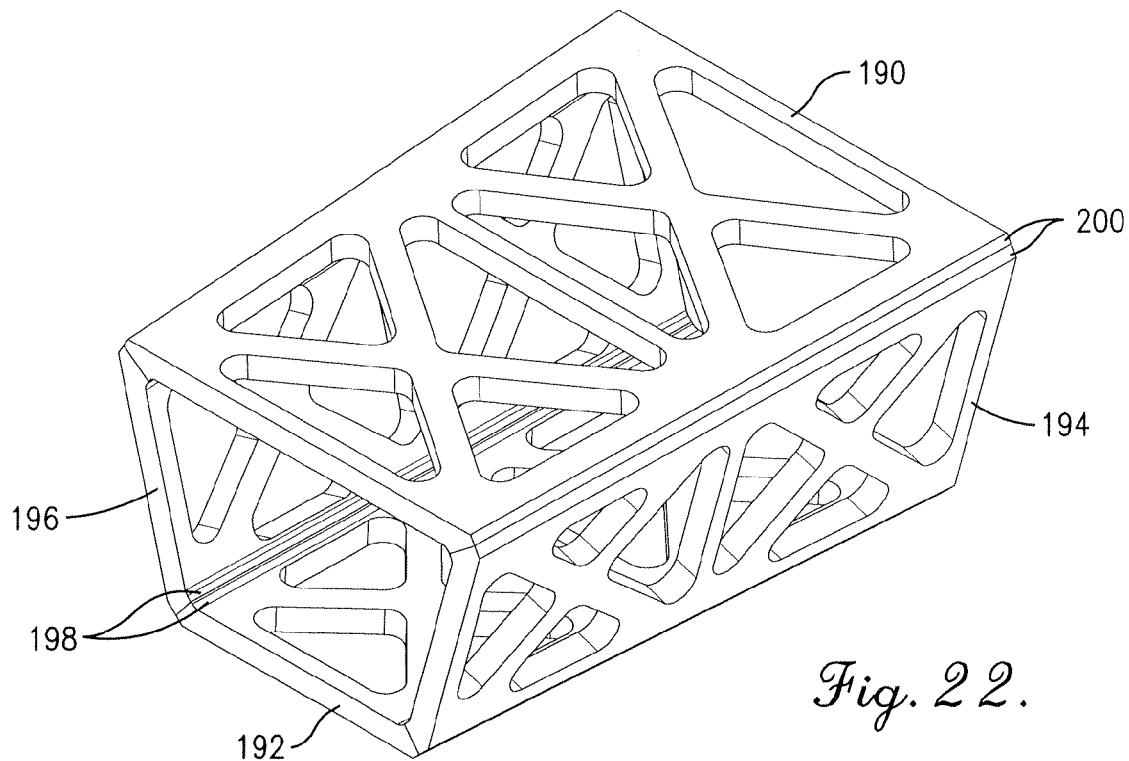
FIG. 22 is a perspective view of a portion of a fourth embodiment of the pylon.
Figure 23:
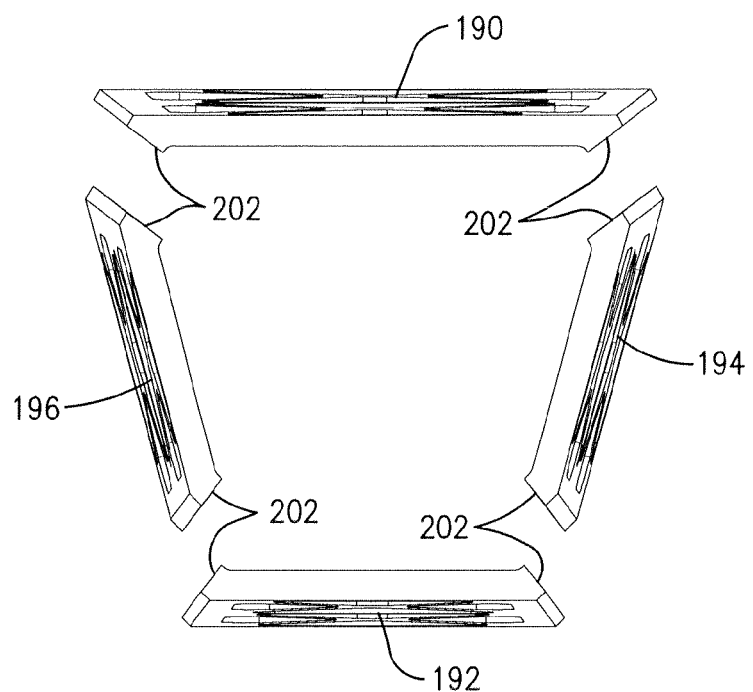
FIG. 23 is a front end view of a cross section of the fourth embodiment of the pylon showing four walls of the pylon separated.
Figure 24:
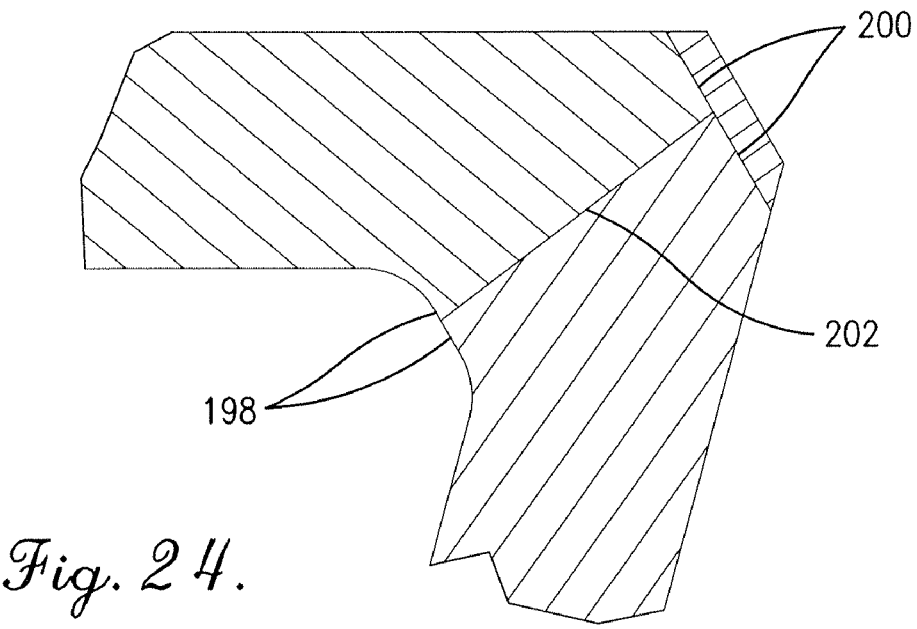
FIG. 24 is a front end view of a cross section of the fourth embodiment of the pylon showing a corner of the pylon.

In a fourth embodiment shown in FIGS. 22-25, the pylon 10 may include a top wall 190, a bottom wall 192, a left side wall 194, and a right side wall 196. These walls may be substantially similar to the like-named walls described above and may be used to assemble the pylon 10 of other embodiments, such as the pylon 10 shown in FIGS. 2, 17, and 19. However, the walls 190, 192, 194, 196 may have the following differences from the like-named walls described above. The left side wall 194 may not include the left upper ledge 106 and the left lower ledge 108. The right side wall 196 may not include the right upper ledge 110 and the right lower ledge 112. As seen in FIG. 24, along the two lengthwise edges of each wall 190, 192, 194, 196, there may be an inner beveled surface 198, an outer beveled surface 200, and a mitered surface 202. The inner beveled surface 198 may extend at an angle from the inner surface of each wall 190, 192, 194, 196 and toward the interior of the pylon 10. The outer beveled surface 200 may extend at an angle from the exterior surface of each wall 190, 192, 194, 196 and generally in the same direction as the inner beveled surface 198 toward the interior of the pylon 10. In various embodiments, the inner beveled surface 198 and the outer beveled surface 200 may be parallel to one another. The mitered surface 202 generally couples the inner beveled surface 198 to the outer beveled surface 200.

The mitered surface 202 may be oriented at a right angle to the inner beveled surface 198 and the outer beveled surface 200, although other orientations are also possible.

Furthermore, the mitered surface 202 may be oriented at an angle that is half of the angle between two adjoining walls 190, 192, 194, 196 of the pylon 10. For example, if the top wall 190 is joined to the left side wall 194 at an angle of approximately 90°, then the corresponding mitered surfaces 202 of the top wall 190 and the left side wall 194 may be oriented at approximately 45°. In various embodiments, the top wall 190 may be wider than the bottom wall 192, with the left side wall 194 and the right side wall 196 being of equal widths. Therefore, the angle between the top wall 190 and the left and right side walls 194, 196 may be less than approximately 90°, and the corresponding mitered surfaces 202 of the top wall 190 and the left and right side walls 194, 196 may be oriented at less than approximately 45°. Additionally, the angle between the bottom wall 192 and the left and right side walls 194, 196 may be greater than approximately 90°, and the corresponding mitered surfaces 202 of the bottom wall 190 and the left and right side walls 194, 196 may be oriented at greater than approximately 45°. Depending on the difference in width between the top wall 190 and the bottom wall 192, the mitered surfaces 202 of all the walls 190, 192, 194, 196 may range from approximately 30° to approximately 60°.

The walls 190, 192, 194, 196 may be first formed to include the inner beveled surface 198, the outer beveled surface 200, and the mitered surface 202, as shown in FIG. 23, by machining the edges, by casting each wall 190, 192, 194, 196 to include the surfaces 198, 200, 202, or by a similar process. The walls 190, 192, 194, 196 may include the truss structures 36, 46, 54, 66, or the structures 36, 46, 54, 66 may be formed after the joining process. Then, the walls 190, 192, 194, 196 may be joined together as shown in FIG. 22 by joining the mitered surfaces 202 of one wall with the mitered surfaces 202 of the adjacent walls such that the joint 114 occurs between the mitered surfaces 202. Thus the joint 114 may be oriented at the same angle as the mitered surfaces 202. The joining process may include welding using electron-beam welding or similar welding techniques for use with titanium and titanium alloys. Once the walls 190, 192, 194, 196 are joined to form the pylon 10, the inner beveled surface 198 of adjoining walls may be aligned to form a substantially continuous inner beveled surface 198 from wall to wall on the interior corners of the pylon 10. Likewise, the outer beveled surface 200 of adjoining walls may be aligned to form a substantially continuous outer beveled surface 200 from wall to wall on the exterior corners of the pylon 10.

The outer beveled surfaces 200 of each wall 190, 192, 194, 196 may also include a small amount of sacrificial joint material 122. The thickness of the sacrificial material 122 may range from approximately 0.1 inches to 0.3 inches. After the joining process is complete, the sacrificial material 122 may be removed from the outer beveled surface 200 and the outer portion of the joint 114.

Figure 25:
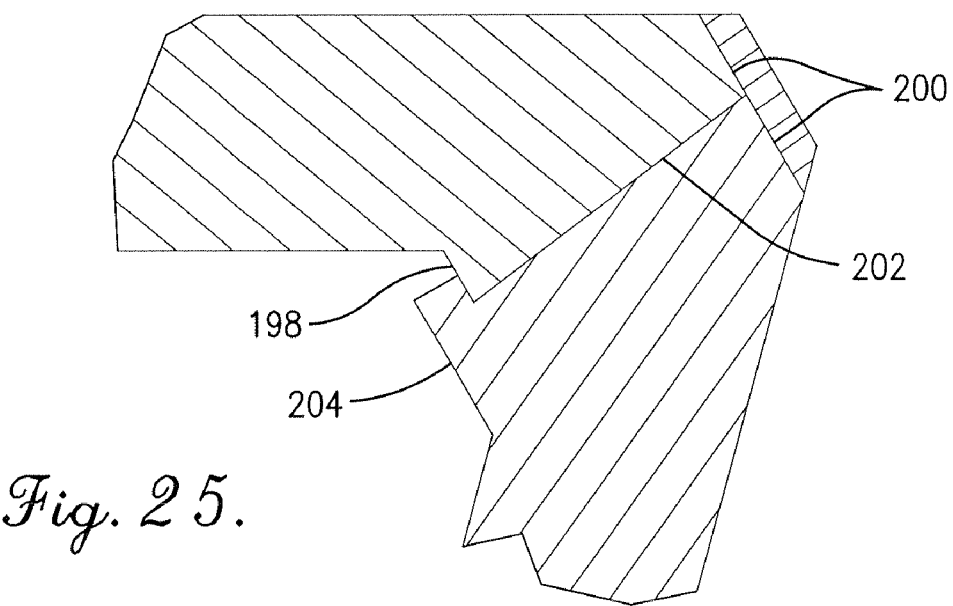
FIG. 25 is a front end view of a cross section of the fourth embodiment of the pylon showing a corner of the pylon including a splatter guard.

In various embodiments, each wall 190, 192, 194, 196 may further include a splatter guard 204, as shown in FIG. 25. The splatter guard 204 may be positioned along one inner beveled surface 198 of each wall 190, 192, 194, 196 and oriented such that when the walls 190, 192, 194, 196 are joined together to form the pylon 10, each inner corner of the pylon 10 includes one splatter guard 204. In some embodiments, there may be a splatter guard 204 along both inner beveled surfaces 198 of opposing walls. For example, the top wall 190 and the bottom wall 192 may each include the splatter guard 204 along both inner beveled surfaces 198. Alternatively, the left side wall 194 and the right side wall 196 may each include the splatter guard 204 along both inner beveled surfaces 198. In either case, when the walls 190, 192, 194, 196 are joined together to form the pylon 10, each inner corner of the pylon 10 includes one splatter guard 204.

The splatter guard 204 may include an additional amount of wall material that is formed along the inner beveled surface 198 and extends outward beyond the mitered surface 202, such that when the walls 190, 192, 194, 196 are joined together, the splatter guard 204 covers the edge of the joint 114 that faces the interior of the pylon 10, as seen in FIG. 25. Typically, the joint 114 is formed between the mitered surface 202 of two walls 190, 192, 194, 196. If the joining process includes welding, particularly e-beam welding, then, without the splatter guard 204, molten material may be ejected from the joint 114 along the mitered surface 202 into the interior of the pylon 10 while the welding is occurring. The splatter guard 204 prevents the ejection of molten material during welding. Once the joining process is complete, the splatter guard 204 may be removed by machining techniques or the like.

The pylon 10 that utilizes the walls 190, 192, 194, 196 of the fourth embodiment benefits from ease of assembly as a result of the simpler joints 114 that are made during the joining process. Furthermore, the walls 190, 192, 194, 196 may be simpler to manufacture than the walls 22, 24, 26, 28, and thus may be lower cost.

At least a portion of the steps of a first method 2600 for creating an aircraft engine pylon 10 in accordance with various embodiments of the present invention is listed in FIG. 26. The steps may be performed in the order as shown in FIG. 26, or they may be performed in a different order. Furthermore, some steps may be performed concurrently as opposed to sequentially.

In connection with steps 2601-2604, a top wall 190, a bottom wall 192, a left side wall 194, and a right side wall 196 may be formed with a mitered surface 202 along each of two opposing sides. The walls 190, 192, 194, 196 may further include an inner beveled surface 198 and an outer beveled surface 200 along each of two opposing sides with the mitered surface 202 positioned between the inner beveled surface 198 and the outer beveled surface 200.

In connection with step 2605, a splatter guard 204 may be formed along one edge of each wall 190, 192, 194, 196 adjacent to the mitered surface 202. The splatter guard 204 may also be formed along the inner beveled surface 200.

In connection with step 2606, the walls 190, 192, 194, 196 are positioned to be joined with one another such that the mitered surfaces 202 of each wall 190, 192, 194, 196 are aligned with the mitered surfaces 202 of the adjacent walls 190, 192, 194, 196 and the splatter guards 204 are positioned in the interior corners of the pylon 10. The inner beveled surfaces 198 of adjacent walls are aligned with one another, and the outer beveled surfaces 200 of adjacent walls 190, 192, 194, 196 are aligned with one another.

In connection with step 2607, the walls 190, 192, 194, 196 are joined together such that no material is ejected into the interior of the pylon 10. During the joining process, a joint 114 is formed between corresponding mitered surfaces 202 of adjacent walls 190, 192, 194, 196. The splatter guard 204 blocks the path from the joint 114 to the interior of the pylon 10. The joining of the walls 190, 192, 194, 196 may be performed using welding, in particular, electron-beam welding.

In connection with step 2608, the splatter guards 204 are removed after the walls 190, 192, 194, 196 are joined together. The splatter guards 206 may be removed by machining techniques.

At least a portion of the steps of a second method 2700 for creating an aircraft engine pylon 10 in accordance with various embodiments of the present invention is listed in FIG. 27. The steps may be performed in the order as shown in FIG. 27, or they may be performed in a different order. Furthermore, some steps may be performed concurrently as opposed to sequentially.

With reference to FIG. 5, in connection with step 2701, a left side wall 26 is formed including a left truss structure 54, a left upper ledge 106, and a left lower ledge 108 with a tab 118 at opposing ends of the left upper ledge 106 and the left lower ledge 108. The left side wall 26 may be formed by forging, casting, or machining. In connection with step 2702, a right side wall 28 is formed including a right truss structure 66, a right upper ledge 110, and a right lower ledge 112 with a tab 118 at opposing ends of the right upper ledge 110 and the right lower ledge 112. The right side wall 28 may be formed by forging, casting, or machining.

With reference to FIGS. 6 and 7, in connection with step 2703, a solid top wall 22 including a pair of tabs 118 at opposing ends is joined with the left upper ledge 106 and the right upper ledge 110 with a joint occurring between the tabs 118. There may be one joint 114 between the top wall 22 and the left upper ledge 106 and one joint 114 between the top wall 22 and the right upper ledge 110. The joining may include e-beam welding or other welding techniques used with titanium or titanium alloys. In connection with step 2704, a solid bottom wall 24 including a pair of tabs 118 at opposing ends is joined with the left lower ledge 108 and the right lower ledge 112 with the joint occurring between the tabs 118. There may be one joint 114 between the bottom wall 24 and the left lower ledge 108 and one joint 114 between the bottom wall 24 and the right lower ledge 112.

With reference to FIGS. 8 and 9, in connection with step 2705, an upper truss structure 36 is formed in the top wall 22 with at least a portion of the upper truss structure 36 located in the left upper ledge 106 and at least a portion of the upper truss structure 36 located in the right upper ledge 110. The upper truss structure 36 may be formed by machining. In connection with step 2706, a lower truss structure 46 is formed in the bottom wall 24 with at least a portion of the lower truss structure 46 located in the left lower ledge 108 and at least a portion of the lower truss structure 46 located in the right lower ledge 112. The lower truss structure 46 may be formed by machining.

In connection with step 2707, all the tabs 118 are removed from the pylon 10. The tabs 118 may be included to facilitate the joining process and may thus be removed after the joining process is complete. In connection with step 2708, a plurality of wing attachment lugs 186 and a plurality of engine attachment lugs 188 are joined to the pylon 10. One or more wing attachment lugs 186 may be a part of a closeout fitting 30, 32. The wing attachment lugs 186 and the engine attachment lugs 188 may be joined by welding or with fasteners.

At least a portion of the steps of a third method 2800 for creating an aircraft engine pylon 10 in accordance with various embodiments of the present invention is listed in FIG. 28. The steps may be performed in the order as shown in FIG. 28, or they may be performed in a different order. Furthermore, some steps may be performed concurrently as opposed to sequentially.

With reference to FIG. 10, in connection with step 2801, a left side wall 26 is formed including a left truss structure 54, a left upper ledge 106, and a left lower ledge 108 with a tab 118 at opposing ends of the left upper ledge 106 and the left lower ledge 108. The left side wall 26 may be formed by forging, casting, or machining. In connection with step 2802, a right side wall 28 is formed including a right truss structure 66, a right upper ledge 110, and a right lower ledge 112 with a tab 118 at opposing ends of the right upper ledge 110 and the right lower ledge 112. The right side wall 28 may be formed by forging, casting, or machining.

In connection with step 2803, a top wall 22 is formed including at least a portion of an upper truss structure 36 with a pair of tabs 118 at opposing ends of the top wall 22. The top wall 22 may be formed by forging, casting, or machining. In connection with step 2804, a bottom wall 24 is formed including at least a portion of a lower truss structure 46 with a pair of tabs 118 at opposing ends of the bottom wall 24. The bottom wall 24 may be formed by forging, casting, or machining.

With reference to FIGS. 11 and 12, in connection with step 2805, the top wall 22 is joined with the left upper ledge 106 and the right upper ledge 110 with a joint 114 occurring between the tabs 118. There may be one joint 114 between the top wall 22 and the left upper ledge 106 and one joint 114 between the top wall 22 and the right upper ledge 110. The joining may include e-beam welding or other welding techniques used with titanium or titanium alloys. In connection with step 2806, the bottom wall 24 is joined with the left lower ledge 108 and the right lower ledge 112 with the joint occurring between the tabs 118. There may be one joint 114 between the bottom wall 24 and the left lower ledge 108 and one joint 114 between the bottom wall 24 and the right lower ledge 112.

In connection with step 2807, a portion of the upper truss structure 36 is formed on the left upper ledge 106 and the right upper ledge 110. The upper truss structure 36 may be formed by machining. In connection with step 2808, a portion of the lower truss structure 46 is formed on the left lower ledge 108 and the right lower ledge 112. The lower truss structure 46 may be formed by machining.

In connection with step 2809, all the tabs 118 are removed from the pylon 10. The tabs 118 may be included to facilitate the joining process and may thus be removed after the joining process is complete. In connection with step 2810, a plurality of wing attachment lugs 186 and a plurality of engine attachment lugs 188 are joined to the pylon 10. One or more wing attachment lugs 186 may be a part of a closeout fitting 30, 32. The wing attachment lugs 186 and the engine attachment lugs 188 may be joined by welding or with fasteners.

At least a portion of the steps of a fourth method 2900 for creating an aircraft engine pylon 10 in accordance with various embodiments of the present invention is listed in FIG. 29. The steps may be performed in the order as shown in FIG. 29, or they may be performed in a different order. Furthermore, some steps may be performed concurrently as opposed to sequentially.

With reference to FIGS. 15 and 16, in connection with step 2901, a left side wall 26 is formed including a left truss structure 54, a left upper ledge 106 that includes at least a portion of an upper truss structure 36, and a left lower ledge 108 that includes at least a portion of a lower truss structure 46. The left side wall 26 may also include a tab 118 at the opposing ends of the left upper ledge 106 and the left lower ledge 108, and may further include sacrificial joint material 122 in the upper truss structure 36 and the lower truss structure 46. The left side wall 26 may be formed by forging, casting, or machining. In connection with step 2902, a right side wall 28 is formed including a right truss structure 66, a right upper ledge 110 that includes at least a portion of the upper truss structure 36, and a right lower ledge 112 that includes at least a portion of the lower truss structure 46. The right side wall 28 may also include a tab 118 at the opposing ends of the right upper ledge 110 and the right lower ledge 112, and may further include sacrificial joint material 122 in the upper truss structure 36 and the lower truss structure 46. The right side wall 28 may be formed by forging, casting, or machining.

In connection with step 2903, a top wall 22 is formed including at least a portion of the upper truss structure 36 that also includes sacrificial joint material 122 and a pair of tabs 118 at opposing ends of the top wall 22. The top wall 22 may be formed by forging, casting, or machining. In connection with step 2904, a bottom wall 24 is formed including at least a portion of the lower truss structure 46 that also includes sacrificial joint material 122 and a pair of tabs 118 at opposing ends of the bottom wall 24. The bottom wall 24 may be formed by forging, casting, or machining.

In connection with step 2905, the top wall 22 is joined with the left upper ledge 106 and the right upper ledge 110 with a plurality of joints 114 occurring between the tabs 118 and the sacrificial joint material 122. There may be space between the portions of the sacrificial joint material 122 along a line 116 where the top wall 22 is joined to the left upper ledge 106 and the right upper ledge 110, thus requiring the plurality of joints 114 to be made. The joining may include e-beam welding or other welding techniques used with titanium or titanium alloys. In connection with step 2906, the bottom wall 24 is joined with the left lower ledge 108 and the right lower ledge 112 with a plurality of joints 114 occurring between the tabs 118 and the sacrificial joint material 122. There may be space between the portions of the sacrificial joint material 122 along the line 116 where the bottom wall 24 is joined to the left lower ledge 108 and the right lower ledge 112, thus requiring the plurality of joints 114 to be made.

In connection with step 2907, all the tabs 118 and the sacrificial joint material 122 are removed from the pylon 10. The tabs 118 and the sacrificial joint material 122 may be included to facilitate the joining process and may thus be removed after the joining process is complete. In connection with step 2908, a plurality of wing attachment lugs 186 and a plurality of engine attachment lugs 188 are joined to the pylon 10. One or more wing attachment lugs 186 may be a part of a closeout fitting 30, 32. The wing attachment lugs 186 and the engine attachment lugs 188 may be joined by welding or with fasteners.

At least a portion of the steps of a fifth method 3000 for creating an aircraft engine pylon 10 in accordance with various embodiments of the present invention is listed in FIG. 30. The steps may be performed in the order as shown in FIG. 30, or they may be performed in a different order. Furthermore, some steps may be performed concurrently as opposed to sequentially.

With reference to FIG. 21, in connection with step 3001, a left side wall 26 is formed including a left truss structure 54, a left upper ledge 106 that includes at least a portion of an upper truss structure 36, and a left lower ledge 108 that includes at least a portion of a lower truss structure 46. The left side wall 26 may be formed by forging, casting, or machining. In connection with step 3002, a right side wall 28 is formed including a right truss structure 66, a right upper ledge 110 that includes at least a portion of the upper truss structure 36, and a right lower ledge 112 that includes at least a portion of the lower truss structure 46. The right side wall 28 may be formed by forging, casting, or machining.

In connection with step 3003, the left side wall 26 is joined with the right side wall 28 such that the first portion of the upper truss structure 36 is joined with the second portion of the upper truss structure 36, and the first portion of the lower truss structure 46 is joined with the second portion of the lower truss structure 46. A plurality of joints 114 may be made to join the portions of the upper truss structure 36 and the portions of the lower truss structure 46. In connection with step 3004, a plurality of wing attachment lugs 186 and a plurality of engine attachment lugs 188 are joined to the pylon 10. One or more wing attachment lugs 186 may be a part of a closeout fitting 30, 32. The wing attachment lugs 186 and the engine attachment lugs 188 may be joined by welding or with fasteners.

Figure 31:
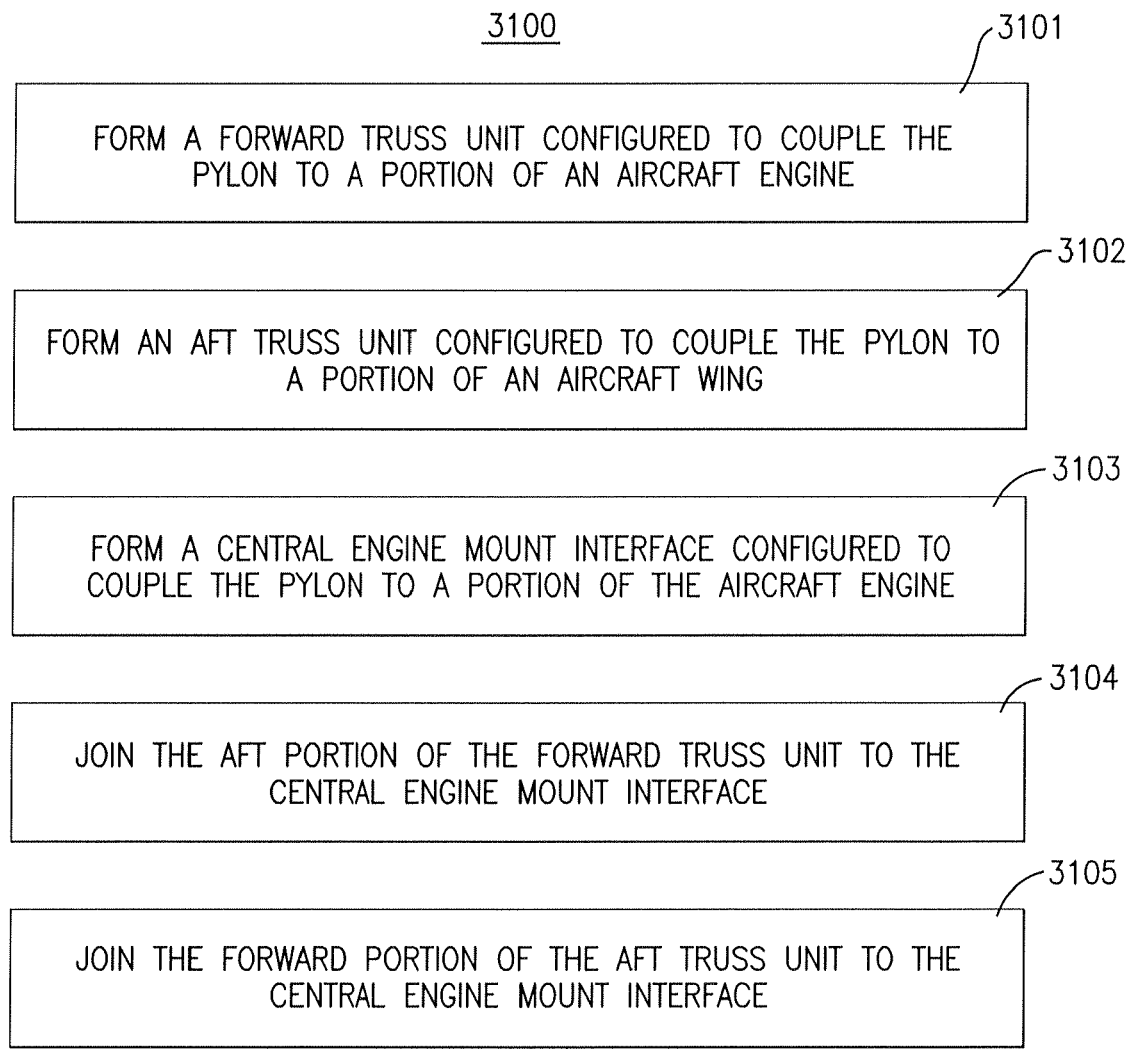
FIG. 31 is a flow diagram of at least a portion of the steps of a sixth embodiment of a method of creating a pylon.

At least a portion of the steps of a sixth method 3100 for creating an aircraft engine pylon 10 in accordance with various embodiments of the present invention is listed in FIG. 31. The steps may be performed in the order as shown in FIG. 31, or they may be performed in a different order. Furthermore, some steps may be performed concurrently as opposed to sequentially.

With reference to FIG. 21, in connection with step 3101, a forward truss unit 124 configured to couple the pylon 10 to a portion of an aircraft engine 12 is formed. The forward truss unit 124 may be formed by the joining of a left forward truss unit 178 and a right forward truss unit 180. The left forward truss unit 178 and the right forward truss unit 180 may be formed by forging, casting, or machining. In connection with step 3102, an aft truss unit 126 configured to couple the pylon 10 to a portion of an aircraft wing 14 is formed. The aft truss unit 126 may be formed by the joining of a left aft truss unit 182 and a right aft truss unit 184. The left aft truss unit 182 and the right aft truss unit 184 may be formed by forging, casting, or machining. In connection with step 3103, a central engine mount interface 128 configured to couple the pylon 10 to a portion of the aircraft engine 12.

In connection with step 3104, the aft portion of the forward truss unit 124 is joined to the central engine mount interface 128. In connection with step 3105, the forward portion of the aft truss unit 126 is joined to the central engine mount interface 128. The joining process may include e-beam welding or other welding techniques used with titanium or titanium alloys.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. An aircraft engine pylon, the pylon comprising:
    a top wall including a connection tab at each of four corners of the top wall;
    a bottom wall including a connection tab at each of four corners of the bottom wall;
    a left side wall including a left upper ledge aligned with the top wall, the left upper ledge including a connection tab at each of two opposing ends of the left upper ledge that align with two of the tabs of the top wall, and a left lower ledge aligned with the bottom wall, the left lower ledge including a connection tab at each of two opposing ends of the left lower ledge that align with two of the tabs of the bottom wall;
    a right side wall including a right upper ledge aligned with the top wall, the right upper ledge including a connection tab at each of two opposing ends of the right upper ledge that align with two of the tabs of the top wall, and a right lower ledge aligned with the bottom wall, the right lower ledge including a connection tab at each of two opposing ends of the right lower ledge that align with two of the tabs of the bottom wall.

2. The pylon of claim 1, further including an upper truss structure formed in the left upper ledge, the right upper ledge, and the top wall.

3. The pylon of claim 2, wherein the upper truss structure includes a plurality of truss members and a plurality of truss nodes wherein each of the truss nodes couples to a portion of the truss members and such that a portion of the truss nodes are formed in the left upper ledge, and a portion of the truss nodes are formed in the right upper ledge.

4. The pylon of claim 1, further including a lower truss structure formed in the left lower ledge, the right lower ledge, and the bottom wall.

5. The pylon of claim 4, wherein the lower truss structure includes a plurality of truss members and a plurality of truss nodes wherein each of the truss nodes couples to a portion of the truss members and such that a portion of the truss nodes are formed in the left lower ledge, and a portion of the truss nodes are formed in the right lower ledge.

6. The pylon of claim 1, further including a left truss structure formed in the left side wall.

7. The pylon of claim 1, further including a right truss structure formed in the right side wall.

8. The pylon of claim 1, further including an engine attachment interface coupled to the bottom wall, the left side wall, and the right side wall and configured to couple the pylon to the aircraft engine.

9. The pylon of claim 1, further including a plurality of wing attachment lugs coupled to the top wall, the left side wall, and the right side wall and configured to couple the pylon to an aircraft wing.

10. An aircraft engine pylon, the pylon comprising:
a top wall including an upper truss structure and a connection tab at each of four corners of the top wall;
a bottom wall including a lower truss structure and a connection tab at each of four corners of the bottom wall;
a left side wall including a left truss structure, the left side wall including a connection tab at each of four corners of the left side wall, wherein two of the tabs align with two tabs of the top wall and the other two tabs align with two tabs of the bottom wall; and
a right side wall including a right truss structure, the right side wall including a connection tab at each of four corners of the right side wall, wherein two of the tabs align with two tabs of the top wall and the other two tabs align with two tabs of the bottom wall.

11. The pylon of claim 10, further including an engine attachment interface coupled to the bottom wall, the left side wall, and the right side wall and configured to couple the pylon to the aircraft engine.

12. The pylon of claim 10, further including a plurality of wing attachment lugs coupled to the top wall, the left side wall, and the right side wall and configured to couple the pylon to an aircraft wing.

13. An aircraft engine pylon, the pylon comprising:
a monolithic top wall including an upper truss structure and a connection tab at each of four corners of the top wall;
a monolithic bottom wall including a lower truss structure and a connection tab at each of four corners of the bottom wall;
a monolithic left side wall including a left truss structure, the left side wall including a connection tab at each of four corners of the left side wall, wherein two of the tabs align with two tabs of the top wall and the other two tabs align with two tabs of the bottom wall; and
a monolithic right side wall including a right truss structure, the right side wall including a connection tab at each of four corners of the right side wall, wherein two of the tabs align with two tabs of the top wall and the other two tabs align with two tabs of the bottom wall.

14. The pylon of claim 13, further including an engine attachment interface coupled to the bottom wall, the left side wall, and the right side wall and configured to couple the pylon to the aircraft engine.

15. The pylon of claim 13, further including a plurality of wing attachment lugs coupled to the top wall, the left side wall, and the right side wall and configured to couple the pylon to an aircraft wing.

* * * * *